(12) United States Patent
Chewter et al.

(10) Patent No.: US 12,552,223 B2
(45) Date of Patent: Feb. 17, 2026

(54) OPTIMAL CONTROL OF CONVECTIVE THERMAL DEVICES

(71) Applicant: GENTHERM INCORPORATED, Northville, MI (US)

(72) Inventors: Alan Chewter, Ypsilanti, MI (US); Satya Mandali, West Bloomfield, MI (US); Mobashar Ahmad, Troy, MI (US); Ankit Tiwari, Farmington Hills, MI (US); Tyler Myers, Plymouth, MI (US); Chad Westerman, Milford, MI (US)

(73) Assignee: Gentherm Incorporated, Northville, MI (US)

( * ) Notice: Subject to any disclaimer, the term of this patent is extended or adjusted under 35 U.S.C. 154(b) by 252 days.

(21) Appl. No.: 18/547,047

(22) PCT Filed: Mar. 16, 2022

(86) PCT No.: PCT/US2022/071181
§ 371 (c)(1),
(2) Date: Aug. 18, 2023

(87) PCT Pub. No.: WO2022/198216
PCT Pub. Date: Sep. 22, 2022

(65) Prior Publication Data
US 2024/0140165 A1 May 2, 2024

Related U.S. Application Data

(60) Provisional application No. 63/162,937, filed on Mar. 18, 2021.

(51) Int. Cl.
*B60H 1/22* (2006.01)
*B60H 1/00* (2006.01)
(Continued)

(52) U.S. Cl.
CPC .......... *B60H 1/00285* (2013.01); *B60H 1/22* (2013.01); *B60N 2/5621* (2013.01);
(Continued)

(58) Field of Classification Search
CPC .. B60N 2/5621; B60N 2/5657; B60N 2/5685; B60N 2/5692; B60H 1/00285;
(Continued)

(56) References Cited

U.S. PATENT DOCUMENTS

| 1,839,156 A | 12/1931 | Lumpkin |
| 2,235,620 A | 3/1941 | Nessell |

(Continued)

FOREIGN PATENT DOCUMENTS

| CA | 979490 | 12/1975 |
| CN | 2128076 | 3/1993 |

(Continued)

OTHER PUBLICATIONS

U.S. Appl. No. 14/821,514, filed Aug. 7, 2015, Lofy.
(Continued)

*Primary Examiner* — Filip Zec
(74) *Attorney, Agent, or Firm* — Knobbe, Martens, Olson & Bear, LLP (57) ABSTRACT

A thermal conditioning system for a vehicle seat or other surface includes a thermoelectric Peltier device (TED) with a main side and a waste side. A flap adjusts a proportion of an airflow over the main and waste side airflow paths based on one or more operational parameters of the system. The operational parameters can include a power provided to the TED, the flow rate of the airflow, a thermal efficiency between the TED and the airflow, and/or a setpoint temperature of the airflow.

21 Claims, 4 Drawing Sheets

(51) Int. Cl.
B60N 2/56 (2006.01)
F24H 3/04 (2022.01)

(52) U.S. Cl.
CPC ......... B60N 2/5685 (2013.01); F24H 3/0405 (2013.01); F24H 2250/06 (2013.01)

(58) Field of Classification Search
CPC .. B60H 1/00821; B60H 1/00878; B60H 1/22; B60H 1/2225; F24F 1/0378; F24F 11/79; F24F 11/81; F24H 2250/06; F24H 3/0405; F25B 21/02; F25B 2321/0211; F25B 2321/0212; F25B 2321/0251; F25B 2500/19; F25B 2700/02
See application file for complete search history.

(56) References Cited

U.S. PATENT DOCUMENTS

| | | |
|---|---|---|
| 2,362,259 A | 11/1944 | Findley |
| 2,363,168 A | 11/1944 | Findley |
| 2,461,432 A | 2/1949 | Mitchell |
| 2,462,984 A | 3/1949 | Maddison |
| 2,493,067 A | 1/1950 | Goldsmith |
| 2,512,559 A | 6/1950 | Williams |
| 2,519,241 A | 8/1950 | Findley |
| 2,782,834 A | 2/1957 | Vigo |
| 2,791,956 A | 5/1957 | Guest |
| 2,813,708 A | 11/1957 | Frey |
| 2,884,956 A | 5/1959 | Perlin |
| 2,931,286 A | 4/1960 | Fry, Sr. et al. |
| 2,959,017 A | 11/1960 | Gilman et al. |
| 2,976,700 A | 3/1961 | Jackson |
| 2,984,077 A | 5/1961 | Gaskill |
| 3,019,609 A | 2/1962 | Pietsch |
| 3,030,145 A | 4/1962 | Kottemann |
| 3,039,817 A | 6/1962 | Taylor |
| 3,077,079 A | 2/1963 | Pietsch |
| 3,085,405 A | 4/1963 | Frantti |
| 3,090,206 A | 5/1963 | Anders |
| 3,136,577 A | 6/1964 | Richard |
| 3,137,142 A | 6/1964 | Venema |
| 3,137,523 A | 6/1964 | Karner |
| 3,138,934 A | 6/1964 | Roane |
| 3,178,894 A | 4/1965 | Mole et al. |
| 3,186,240 A | 6/1965 | Daubert |
| 3,197,342 A | 7/1965 | Neild |
| 3,212,275 A | 10/1965 | Tillman |
| 3,240,628 A | 3/1966 | Sonntag, Jr. |
| 3,253,649 A | 5/1966 | Laing |
| 3,266,064 A | 8/1966 | Figman |
| 3,282,267 A | 11/1966 | Eidus |
| 3,298,195 A | 1/1967 | Raskhodoff |
| 3,300,649 A | 1/1967 | Strawn |
| 3,325,312 A | 6/1967 | Sonntag, Jr. |
| 3,326,727 A | 6/1967 | Fritts |
| 3,351,498 A | 11/1967 | Shinn et al. |
| 3,366,164 A | 1/1968 | Newton |
| 3,392,535 A | 7/1968 | Castelet |
| 3,486,177 A | 12/1969 | Marshack |
| 3,529,310 A | 9/1970 | Olmo |
| 3,550,523 A | 12/1970 | Segal |
| 3,599,437 A | 8/1971 | Panas |
| 3,615,870 A | 10/1971 | Crouthamel |
| 3,627,299 A | 12/1971 | Schwartze et al. |
| 3,632,451 A | 1/1972 | Abbott |
| 3,640,456 A | 2/1972 | Sturgis |
| 3,648,469 A | 3/1972 | Chapman |
| 3,703,141 A | 11/1972 | Pernoud |
| 3,767,470 A | 10/1973 | Hines |
| 3,786,230 A | 1/1974 | Brandenburg, Jr. |
| 3,819,418 A | 6/1974 | Winkler et al. |
| 3,839,876 A | 10/1974 | Privas |
| 3,870,568 A | 3/1975 | Oesterhelt et al. |
| 3,876,860 A | 4/1975 | Nomura et al. |
| 3,894,213 A | 7/1975 | Agarwala |
| 3,899,054 A | 8/1975 | Huntress et al. |
| 3,902,923 A | 9/1975 | Evans et al. |
| 3,916,151 A | 10/1975 | Reix |
| 3,926,052 A | 12/1975 | Bechtel |
| 3,927,299 A | 12/1975 | Sturgis |
| 3,928,876 A | 12/1975 | Starr |
| 4,002,108 A | 1/1977 | Drori |
| 4,044,824 A | 8/1977 | Eskeli |
| 4,100,963 A | 7/1978 | Dillenbeck |
| 4,124,794 A | 11/1978 | Eder |
| 4,152,094 A | 5/1979 | Honda et al. |
| 4,195,687 A | 4/1980 | Taziker |
| 4,223,205 A | 9/1980 | Sturgis |
| 4,224,565 A | 9/1980 | Sosniak et al. |
| 4,281,516 A | 8/1981 | Berthet et al. |
| 4,301,658 A | 11/1981 | Reed |
| 4,314,008 A | 2/1982 | Blake |
| 4,315,599 A | 2/1982 | Biancardi |
| 4,336,444 A | 6/1982 | Bice et al. |
| 4,338,944 A | 7/1982 | Arkans |
| 4,373,861 A | 2/1983 | Papst et al. |
| 4,391,009 A | 7/1983 | Schild et al. |
| 4,413,857 A | 11/1983 | Hayashi |
| 4,423,308 A | 12/1983 | Callaway et al. |
| 4,437,702 A | 3/1984 | Agosta |
| 4,438,070 A | 3/1984 | Stephens et al. |
| 4,459,428 A | 7/1984 | Chou |
| 4,491,173 A | 1/1985 | Demand |
| 4,493,939 A | 1/1985 | Blaske et al. |
| 4,497,973 A | 2/1985 | Heath et al. |
| 4,506,510 A | 3/1985 | Tircot |
| 4,518,700 A | 5/1985 | Stephens |
| 4,518,847 A | 5/1985 | Horst, Sr. et al. |
| 4,549,134 A | 10/1985 | Weiss |
| 4,554,968 A | 11/1985 | Haas |
| 4,567,351 A | 1/1986 | Kitagawa et al. |
| 4,572,430 A | 2/1986 | Takagi et al. |
| 4,611,089 A | 9/1986 | Elsner et al. |
| 4,639,883 A | 1/1987 | Michaelis |
| 4,665,707 A | 5/1987 | Hamilton |
| 4,671,567 A | 6/1987 | Frobose |
| 4,677,416 A | 6/1987 | Nishimoto et al. |
| 4,685,727 A | 8/1987 | Cremer et al. |
| 4,688,390 A | 8/1987 | Sawyer |
| 4,704,320 A | 11/1987 | Mizunoya et al. |
| 4,711,294 A | 12/1987 | Jacobs et al. |
| 4,712,832 A | 12/1987 | Antolini et al. |
| 4,777,802 A | 10/1988 | Feher |
| 4,782,664 A | 11/1988 | Sterna et al. |
| 4,791,274 A | 12/1988 | Horst |
| 4,793,651 A | 12/1988 | Inagaki et al. |
| 4,802,929 A | 2/1989 | Schock |
| 4,806,081 A | 2/1989 | Harmsen et al. |
| 4,812,733 A | 3/1989 | Tobey |
| 4,823,554 A | 4/1989 | Trachtenberg et al. |
| 4,825,488 A | 5/1989 | Bedford |
| 4,828,627 A | 5/1989 | Connery |
| 4,853,992 A | 8/1989 | Yu |
| 4,923,248 A | 5/1990 | Feher |
| 4,947,648 A | 8/1990 | Harwell et al. |
| 4,969,684 A | 11/1990 | Zarotti |
| 4,981,324 A | 1/1991 | Law |
| 4,988,847 A | 1/1991 | Argos et al. |
| 4,997,230 A | 3/1991 | Spitalnick |
| 5,002,336 A | 3/1991 | Feher |
| 5,012,325 A | 4/1991 | Mansuria et al. |
| 5,014,909 A | 5/1991 | Yasuo |
| 5,016,304 A | 5/1991 | Ryhiner |
| 5,022,462 A | 6/1991 | Flint et al. |
| 5,028,216 A | 7/1991 | Harmsen et al. |
| 5,057,490 A | 10/1991 | Skertic |
| 5,070,937 A | 12/1991 | Mougin et al. |
| 5,077,709 A | 12/1991 | Feher |
| 5,088,790 A | 2/1992 | Wainwright et al. |
| 5,097,674 A | 3/1992 | Imaiida et al. |
| 5,102,189 A | 4/1992 | Saito et al. |
| 5,106,161 A | 4/1992 | Meiller |
| 5,111,025 A | 5/1992 | Barma et al. |
| 5,111,664 A | 5/1992 | Yang |

(56) References Cited

U.S. PATENT DOCUMENTS

| | | |
|---|---|---|
| 5,117,638 A | 6/1992 | Feher |
| 5,119,640 A | 6/1992 | Conrad |
| 5,125,238 A | 6/1992 | Ragan et al. |
| 5,148,977 A | 9/1992 | Hibino et al. |
| 5,166,777 A | 11/1992 | Kataoka |
| 5,187,349 A | 2/1993 | Curhan et al. |
| 5,188,286 A | 2/1993 | Pence, IV |
| 5,255,735 A | 10/1993 | Raghava et al. |
| 5,256,857 A | 10/1993 | Curhan et al. |
| 5,265,599 A | 11/1993 | Stephenson et al. |
| 5,278,936 A | 1/1994 | Shao |
| 5,279,128 A | 1/1994 | Tomatsu et al. |
| 5,335,381 A | 8/1994 | Chang |
| 5,367,728 A | 11/1994 | Chang |
| 5,372,402 A | 12/1994 | Kuo |
| 5,375,421 A | 12/1994 | Hsieh |
| 5,382,075 A | 1/1995 | Shih |
| 5,385,382 A | 1/1995 | Single, II et al. |
| 5,409,547 A | 4/1995 | Watanabe et al. |
| 5,413,166 A | 5/1995 | Kerner et al. |
| 5,416,935 A | 5/1995 | Nieh |
| 5,419,489 A | 5/1995 | Burd |
| 5,419,780 A | 5/1995 | Suski |
| 5,430,322 A | 7/1995 | Koyanagi et al. |
| 5,436,519 A | 7/1995 | Takahashi et al. |
| 5,448,788 A | 9/1995 | Wu |
| 5,448,891 A | 9/1995 | Nakagiri et al. |
| 5,449,275 A | 9/1995 | Gluszek et al. |
| 5,456,081 A | 10/1995 | Chrysler et al. |
| 5,473,783 A | 12/1995 | Allen |
| 5,493,742 A | 2/1996 | Klearman |
| 5,493,864 A | 2/1996 | Pomerene et al. |
| 5,497,632 A | 3/1996 | Robinson |
| 5,505,520 A | 4/1996 | Frusti et al. |
| 5,515,238 A | 5/1996 | Fritz et al. |
| 5,524,439 A | 6/1996 | Gallup et al. |
| 5,542,503 A | 8/1996 | Dunn et al. |
| 5,544,487 A | 8/1996 | Attey et al. |
| 5,544,488 A | 8/1996 | Reid |
| 5,555,732 A | 9/1996 | Whiticar |
| 5,561,981 A | 10/1996 | Quisenberry et al. |
| 5,576,512 A | 11/1996 | Doke |
| 5,584,084 A | 12/1996 | Klearman et al. |
| 5,584,183 A | 12/1996 | Wright et al. |
| 5,594,609 A | 1/1997 | Lin |
| 5,597,200 A | 1/1997 | Gregory et al. |
| 5,601,399 A | 2/1997 | Okpara et al. |
| 5,606,639 A | 2/1997 | Lehoe et al. |
| 5,613,729 A | 3/1997 | Summer, Jr. |
| 5,613,730 A | 3/1997 | Buie et al. |
| 5,623,828 A | 4/1997 | Harrington |
| 5,626,021 A | 5/1997 | Karunasiri et al. |
| 5,626,386 A | 5/1997 | Lush |
| 5,634,342 A | 6/1997 | Peeters et al. |
| 5,637,921 A | 6/1997 | Burward-Hoy |
| 5,640,728 A | 6/1997 | Graebe |
| 5,642,539 A | 7/1997 | Kuo |
| 5,645,314 A | 7/1997 | Liou |
| 5,650,904 A | 7/1997 | Gilley et al. |
| 5,653,741 A | 8/1997 | Grant |
| 5,660,310 A | 8/1997 | LeGrow |
| 5,667,622 A | 9/1997 | Hasegawa et al. |
| 5,675,852 A | 10/1997 | Watkins |
| 5,690,849 A | 11/1997 | DeVilbiss et al. |
| 5,692,952 A | 12/1997 | Chih-Hung |
| 5,704,213 A | 1/1998 | Smith et al. |
| 5,715,695 A | 2/1998 | Lord |
| 5,721,804 A | 2/1998 | Greene, III |
| 5,724,818 A | 3/1998 | Iwata et al. |
| 5,729,981 A | 3/1998 | Markus et al. |
| 5,734,122 A | 3/1998 | Aspden |
| 5,761,908 A | 6/1998 | Oas et al. |
| 5,761,909 A | 6/1998 | Hughes et al. |
| 5,772,500 A | 6/1998 | Harvey et al. |
| 5,798,583 A | 8/1998 | Morita |
| 5,800,490 A | 9/1998 | Patz et al. |
| 5,802,855 A | 9/1998 | Yamaguchi et al. |
| 5,802,856 A | 9/1998 | Schaper et al. |
| 5,822,993 A | 10/1998 | Attey |
| 5,827,424 A | 10/1998 | Gillis et al. |
| 5,833,321 A | 11/1998 | Kim et al. |
| 5,850,741 A | 12/1998 | Feher |
| 5,865,031 A | 2/1999 | Itakura |
| 5,871,151 A | 2/1999 | Fiedrich |
| 5,884,485 A | 3/1999 | Yamaguchi et al. |
| 5,884,486 A | 3/1999 | Hughes et al. |
| 5,887,304 A | 3/1999 | Von der Heyde |
| 5,888,261 A | 3/1999 | Fortune |
| 5,895,964 A | 4/1999 | Nakayama |
| 5,902,014 A | 5/1999 | Dinkel et al. |
| 5,921,100 A | 7/1999 | Yoshinori et al. |
| 5,921,314 A | 7/1999 | Schuller et al. |
| 5,921,858 A | 7/1999 | Kawai et al. |
| 5,924,289 A | 7/1999 | Bishop, II |
| 5,924,766 A | 7/1999 | Esaki et al. |
| 5,924,767 A | 7/1999 | Pietryga |
| 5,927,817 A | 7/1999 | Ekman et al. |
| 5,934,748 A | 8/1999 | Faust et al. |
| 5,936,192 A | 8/1999 | Tauchi |
| 5,937,908 A | 8/1999 | Inoshiri et al. |
| 5,948,303 A | 9/1999 | Larson |
| 5,950,067 A | 9/1999 | Maegawa et al. |
| 5,952,728 A | 9/1999 | Imanishi et al. |
| 5,987,893 A | 11/1999 | Schultz-Harder et al. |
| 5,988,568 A | 11/1999 | Drews |
| 5,992,154 A | 11/1999 | Kawada et al. |
| 5,994,637 A | 11/1999 | Imanushi et al. |
| 5,995,711 A | 11/1999 | Fukuoka et al. |
| 6,000,225 A | 12/1999 | Ghoshal |
| 6,003,950 A | 12/1999 | Larsson |
| 6,006,524 A | 12/1999 | Park |
| 6,019,420 A | 2/2000 | Faust et al. |
| 6,038,865 A | 3/2000 | Watanabe et al. |
| 6,048,024 A | 4/2000 | Wallman |
| 6,049,655 A | 4/2000 | Vazirani |
| 6,052,853 A | 4/2000 | Schmid |
| 6,053,163 A | 4/2000 | Bass |
| 6,059,018 A | 5/2000 | Yoshinori et al. |
| 6,062,641 A | 5/2000 | Suzuki et al. |
| 6,072,924 A | 6/2000 | Sato et al. |
| 6,072,938 A | 6/2000 | Peterson et al. |
| 6,073,998 A | 6/2000 | Siarkowski et al. |
| 6,079,485 A | 6/2000 | Esaki et al. |
| 6,084,172 A | 7/2000 | Kishi et al. |
| 6,085,369 A | 7/2000 | Feher |
| 6,086,831 A | 7/2000 | Harness et al. |
| 6,087,638 A | 7/2000 | Silverbrook |
| 6,094,919 A | 8/2000 | Bhatia |
| 6,097,088 A | 8/2000 | Sakuragi |
| 6,100,463 A | 8/2000 | Ladd et al. |
| 6,101,815 A | 8/2000 | van Oort et al. |
| 6,103,967 A | 8/2000 | Cauchy et al. |
| 6,105,373 A | 8/2000 | Watanabe et al. |
| 6,109,688 A | 8/2000 | Wurz et al. |
| 6,112,525 A | 9/2000 | Yoshida et al. |
| 6,112,531 A | 9/2000 | Yamaguchi |
| 6,116,029 A | 9/2000 | Krawec |
| 6,119,463 A | 9/2000 | Bell |
| 6,120,370 A | 9/2000 | Asou et al. |
| 6,127,619 A | 10/2000 | Xi et al. |
| 6,141,969 A | 11/2000 | Launchbury et al. |
| 6,145,925 A | 11/2000 | Eksin et al. |
| 6,158,224 A | 12/2000 | Hu et al. |
| 6,161,241 A | 12/2000 | Zysman |
| 6,161,388 A | 12/2000 | Ghoshal |
| 6,164,076 A | 12/2000 | Chu et al. |
| 6,164,719 A | 12/2000 | Rauh |
| 6,166,905 A | 12/2000 | Oyamada et al. |
| 6,171,333 B1 | 1/2001 | Nelson et al. |
| 6,178,292 B1 | 1/2001 | Fukuoka et al. |
| 6,179,706 B1 | 1/2001 | Yoshinori et al. |
| 6,186,592 B1 | 2/2001 | Orizakis et al. |
| 6,189,966 B1 | 2/2001 | Faust et al. |
| 6,189,967 B1 | 2/2001 | Short |

(56) References Cited

U.S. PATENT DOCUMENTS

| | | |
|---|---|---|
| 6,196,627 B1 | 3/2001 | Faust et al. |
| 6,196,839 B1 | 3/2001 | Ross |
| 6,206,465 B1 | 3/2001 | Faust et al. |
| 6,213,198 B1 | 4/2001 | Shikata et al. |
| 6,222,243 B1 | 4/2001 | Kishi et al. |
| 6,223,539 B1 | 5/2001 | Bell |
| 6,233,959 B1 | 5/2001 | Kang et al. |
| 6,250,083 B1 | 6/2001 | Chou |
| 6,256,996 B1 | 7/2001 | Ghoshal |
| 6,262,357 B1 | 7/2001 | Johnson et al. |
| 6,263,530 B1 | 7/2001 | Feher |
| 6,266,962 B1 | 7/2001 | Ghoshal |
| 6,282,907 B1 | 9/2001 | Ghoshal |
| 6,289,982 B1 | 9/2001 | Naji |
| 6,291,803 B1 | 9/2001 | Fourrey |
| 6,306,673 B1 | 10/2001 | Imanishi et al. |
| 6,326,610 B1 | 12/2001 | Muramatsu et al. |
| 6,336,237 B1 | 1/2002 | Schmid |
| 6,338,251 B1 | 1/2002 | Ghoshal |
| 6,341,395 B1 | 1/2002 | Chao |
| 6,343,011 B1 | 1/2002 | Yu |
| 6,345,507 B1 | 2/2002 | Gillen |
| 6,347,521 B1 | 2/2002 | Kadotani et al. |
| 6,378,311 B1 | 4/2002 | McCordic |
| 6,385,976 B1 | 5/2002 | Yamamura et al. |
| 6,391,676 B1 | 5/2002 | Tsuzaki et al. |
| 6,393,842 B2 | 5/2002 | Kim et al. |
| 6,400,013 B1 | 6/2002 | Tsuzaki et al. |
| 6,402,470 B1 | 6/2002 | Kvasnak et al. |
| 6,410,971 B1 | 6/2002 | Otey |
| 6,425,527 B1 | 7/2002 | Smole |
| 6,427,449 B1 | 8/2002 | Logan et al. |
| 6,434,328 B2 | 8/2002 | Rutherford |
| 6,438,964 B1 | 8/2002 | Giblin |
| 6,444,893 B1 | 9/2002 | Onoue et al. |
| 6,452,740 B1 | 9/2002 | Ghoshal |
| 6,470,696 B1 | 10/2002 | Palfy et al. |
| 6,474,073 B1 | 11/2002 | Uetsuji et al. |
| 6,481,801 B1 | 11/2002 | Schmale |
| 6,487,739 B1 | 12/2002 | Harker |
| 6,489,551 B2 | 12/2002 | Chu et al. |
| 6,490,879 B1 | 12/2002 | Lloyd et al. |
| 6,492,585 B1 | 12/2002 | Zamboni et al. |
| 6,493,888 B1 | 12/2002 | Salvatini et al. |
| 6,493,889 B2 | 12/2002 | Kocurek |
| 6,509,704 B1 | 1/2003 | Brown |
| 6,511,125 B1 | 1/2003 | Gendron |
| 6,519,949 B1 | 2/2003 | Wernlund et al. |
| 6,539,725 B2 | 4/2003 | Bell |
| 6,541,737 B1 | 4/2003 | Eksin et al. |
| 6,541,743 B2 | 4/2003 | Chen |
| 6,546,576 B1 | 4/2003 | Lin |
| 6,548,894 B2 | 4/2003 | Chu et al. |
| 6,552,256 B2 | 4/2003 | Shakouri et al. |
| 6,552,464 B1 | 4/2003 | Rahbar et al. |
| 6,557,353 B1 | 5/2003 | Fusco et al. |
| RE38,128 E | 6/2003 | Gallup et al. |
| 6,571,564 B2 | 6/2003 | Upadhye et al. |
| 6,573,596 B2 | 6/2003 | Saika |
| 6,574,967 B1 | 6/2003 | Park et al. |
| 6,578,986 B2 | 6/2003 | Swaris et al. |
| 6,580,025 B2 | 6/2003 | Guy |
| 6,581,225 B1 | 6/2003 | Imai |
| 6,583,638 B2 | 6/2003 | Costello et al. |
| 6,598,251 B2 | 7/2003 | Habboub et al. |
| 6,598,405 B2 | 7/2003 | Bell |
| 6,604,576 B2 | 8/2003 | Noda et al. |
| 6,604,785 B2 | 8/2003 | Bargheer et al. |
| 6,605,955 B1 | 8/2003 | Costello et al. |
| 6,606,754 B1 | 8/2003 | Flick |
| 6,606,866 B2 | 8/2003 | Bell |
| 6,619,044 B2 | 9/2003 | Batchelor et al. |
| 6,619,736 B2 | 9/2003 | Stowe et al. |
| 6,625,990 B2 | 9/2003 | Bell |
| 6,626,488 B2 | 9/2003 | Pfahler |
| 6,629,724 B2 | 10/2003 | Ekern et al. |
| 6,637,210 B2 | 10/2003 | Bell |
| 6,644,735 B2 | 11/2003 | Bargheer et al. |
| 6,653,607 B2 | 11/2003 | Ellis et al. |
| 6,672,076 B2 | 1/2004 | Bell |
| 6,676,207 B2 | 1/2004 | Rauh et al. |
| 6,684,437 B2 | 2/2004 | Koenig |
| 6,686,532 B1 | 2/2004 | Macris |
| 6,687,937 B2 | 2/2004 | Harker |
| 6,695,402 B2 | 2/2004 | Sloan, Jr. |
| 6,700,052 B2 | 3/2004 | Bell |
| 6,705,089 B2 | 3/2004 | Chu et al. |
| 6,708,352 B2 | 3/2004 | Salvatini et al. |
| 6,711,767 B2 | 3/2004 | Klamm |
| 6,711,904 B1 | 3/2004 | Law et al. |
| 6,719,039 B2 | 4/2004 | Calaman et al. |
| 6,725,669 B2 | 4/2004 | Melaragni |
| 6,727,422 B2 | 4/2004 | Macris |
| 6,730,115 B1 | 5/2004 | Heaton |
| 6,739,138 B2 | 5/2004 | Saunders et al. |
| 6,739,655 B1 | 5/2004 | Schwochert et al. |
| 6,743,972 B2 | 6/2004 | Macris |
| 6,761,399 B2 | 7/2004 | Bargheer et al. |
| 6,764,502 B2 | 7/2004 | Bieberich |
| 6,767,766 B2 | 7/2004 | Chu et al. |
| 6,772,829 B2 | 8/2004 | Lebrun |
| 6,774,346 B2 | 8/2004 | Clothier |
| 6,786,541 B2 | 9/2004 | Haupt et al. |
| 6,786,545 B2 | 9/2004 | Bargheer et al. |
| 6,790,481 B2 | 9/2004 | Bishop et al. |
| 6,793,016 B2 | 9/2004 | Aoki et al. |
| 6,804,966 B1 | 10/2004 | Chu et al. |
| 6,808,230 B2 | 10/2004 | Buss et al. |
| 6,812,395 B2 | 11/2004 | Bell |
| 6,815,814 B2 | 11/2004 | Chu et al. |
| 6,817,191 B2 | 11/2004 | Watanabe |
| 6,817,197 B1 | 11/2004 | Padfield |
| 6,817,675 B2 | 11/2004 | Buss et al. |
| 6,818,817 B2 | 11/2004 | Macris |
| 6,823,678 B1 | 11/2004 | Li |
| 6,828,528 B2 | 12/2004 | Stowe et al. |
| 6,832,732 B2 | 12/2004 | Burkett et al. |
| 6,834,509 B2 | 12/2004 | Palfy et al. |
| 6,840,305 B2 | 1/2005 | Zheng et al. |
| 6,840,576 B2 | 1/2005 | Ekern et al. |
| 6,841,957 B2 | 1/2005 | Brown |
| 6,845,622 B2 | 1/2005 | Sauciuc et al. |
| 6,855,158 B2 | 2/2005 | Stolpmann |
| 6,855,880 B2 | 2/2005 | Feher |
| 6,857,697 B2 | 2/2005 | Brennan et al. |
| 6,857,954 B2 | 2/2005 | Luedtke |
| 6,868,690 B2 | 3/2005 | Faqih |
| 6,871,365 B2 | 3/2005 | Flick et al. |
| 6,876,549 B2 | 4/2005 | Beitmal et al. |
| 6,886,351 B2 | 5/2005 | Palfy et al. |
| 6,892,807 B2 | 5/2005 | Fristedt et al. |
| 6,893,086 B2 | 5/2005 | Bajic et al. |
| 6,904,629 B2 | 6/2005 | Wu |
| 6,907,739 B2 | 6/2005 | Bell |
| 6,916,160 B2 | 7/2005 | Obara |
| 6,923,216 B2 | 8/2005 | Extrand et al. |
| 6,933,469 B2 | 8/2005 | Ellis et al. |
| 6,935,122 B2 | 8/2005 | Huang |
| 6,954,944 B2 | 10/2005 | Feher |
| 6,959,555 B2 | 11/2005 | Bell |
| 6,962,195 B2 | 11/2005 | Smith et al. |
| 6,963,053 B2 | 11/2005 | Lutz |
| 6,967,309 B2 | 11/2005 | Wyatt et al. |
| 6,976,734 B2 | 12/2005 | Stoewe |
| 6,977,360 B2 | 12/2005 | Weiss |
| 6,981,380 B2 | 1/2006 | Chrysler et al. |
| 6,990,701 B2 | 1/2006 | Litvak |
| 7,000,490 B1 | 2/2006 | Micheels |
| 7,036,163 B2 | 5/2006 | Schmid |
| 7,040,710 B2 | 5/2006 | White et al. |
| 7,052,091 B2 | 5/2006 | Bajic et al. |
| 7,063,163 B2 | 6/2006 | Steele et al. |
| 7,066,306 B2 | 6/2006 | Gavin |
| 7,070,231 B1 | 7/2006 | Wong |

(56) References Cited

U.S. PATENT DOCUMENTS

| | | | |
|---|---|---|---|
| 7,070,232 B2 | 7/2006 | Minegishi et al. | |
| 7,071,587 B2 | 7/2006 | Lopatinsky et al. | |
| 7,075,034 B2 | 7/2006 | Bargheer et al. | |
| 7,082,772 B2 | 8/2006 | Welch | |
| 7,084,502 B2 | 8/2006 | Bottner et al. | |
| 7,100,978 B2 | 9/2006 | Ekern et al. | |
| 7,108,319 B2 | 9/2006 | Hartwich et al. | |
| 7,111,465 B2 | 9/2006 | Bell | |
| 7,114,771 B2 | 10/2006 | Lofy et al. | |
| 7,124,593 B2 | 10/2006 | Feher | |
| 7,131,689 B2 | 11/2006 | Brennan et al. | |
| 7,134,715 B1 | 11/2006 | Fristedt et al. | |
| 7,141,763 B2 | 11/2006 | Moroz | |
| 7,147,279 B2 | 12/2006 | Bevan et al. | |
| 7,165,281 B2 | 1/2007 | Larsssson et al. | |
| 7,168,758 B2 | 1/2007 | Bevan et al. | |
| 7,178,344 B2 | 2/2007 | Bell | |
| 7,201,441 B2 | 4/2007 | Stoewe et al. | |
| 7,202,444 B2 | 4/2007 | Bulgajewski | |
| 7,213,876 B2 | 5/2007 | Stoewe | |
| 7,220,048 B2 | 5/2007 | Kohlgrüber et al. | |
| 7,224,059 B2 | 5/2007 | Shimada et al. | |
| 7,231,772 B2 | 6/2007 | Bell | |
| 7,244,887 B2 | 7/2007 | Miley | |
| 7,246,496 B2 | 7/2007 | Goenka et al. | |
| 7,272,936 B2 | 9/2007 | Feher | |
| 7,273,981 B2 | 9/2007 | Bell | |
| 7,299,639 B2 | 11/2007 | Leija et al. | |
| 7,320,223 B1 | 1/2008 | Dabney et al. | |
| 7,337,615 B2 | 3/2008 | Reidy | |
| 7,338,117 B2 | 3/2008 | Iqbal et al. | |
| 7,340,907 B2 | 3/2008 | Vogh et al. | |
| 7,355,146 B2 | 4/2008 | Angelis et al. | |
| 7,356,912 B2 | 4/2008 | Iqbal et al. | |
| 7,360,365 B2 | 4/2008 | Codecasa et al. | |
| 7,360,416 B2 | 4/2008 | Manaka et al. | |
| 7,370,479 B2 | 5/2008 | Pfannenberg | |
| 7,370,911 B2 | 5/2008 | Bajic et al. | |
| 7,380,586 B2 | 6/2008 | Gawthrop | |
| 7,425,034 B2 | 9/2008 | Bajic et al. | |
| 7,426,835 B2 | 9/2008 | Bell et al. | |
| 7,462,028 B2 | 12/2008 | Cherala et al. | |
| 7,469,432 B2 | 12/2008 | Chambers | |
| 7,475,464 B2 | 1/2009 | Lofy et al. | |
| 7,475,938 B2 | 1/2009 | Stoewe et al. | |
| 7,478,869 B2 | 1/2009 | Lazanja et al. | |
| 7,480,950 B2 | 1/2009 | Feher | |
| 7,506,924 B2 | 3/2009 | Bargheer et al. | |
| 7,506,938 B2 | 3/2009 | Brennan et al. | |
| 7,513,273 B2 | 4/2009 | Bivin | |
| 7,581,785 B2 | 9/2009 | Heckmann et al. | |
| 7,587,901 B2 | 9/2009 | Petrovski | |
| 7,587,902 B2 | 9/2009 | Bell | |
| 7,591,507 B2 | 9/2009 | Giffin et al. | |
| 7,608,777 B2 | 10/2009 | Bell et al. | |
| 7,621,594 B2 | 11/2009 | Hartmann et al. | |
| 7,640,754 B2 | 1/2010 | Wolas | |
| 7,665,803 B2 | 2/2010 | Wolas | |
| 7,708,338 B2 | 5/2010 | Wolas | |
| 7,731,279 B2 | 6/2010 | Asada et al. | |
| RE41,765 E | 9/2010 | Gregory et al. | |
| 7,827,620 B2 | 11/2010 | Feher | |
| 7,827,805 B2 | 11/2010 | Comiskey et al. | |
| 7,832,214 B2 | 11/2010 | Ito et al. | |
| 7,862,113 B2 | 1/2011 | Knoll | |
| 7,866,017 B2 | 1/2011 | Knoll | |
| 7,877,827 B2 | 2/2011 | Marquette et al. | |
| 7,937,789 B2 | 5/2011 | Feher | |
| 7,963,594 B2 | 6/2011 | Wolas | |
| 7,966,835 B2 | 6/2011 | Petrovski | |
| 7,969,738 B2 | 6/2011 | Koo | |
| 7,996,936 B2 | 8/2011 | Marquette et al. | |
| 8,062,797 B2 | 11/2011 | Fisher et al. | |
| 8,065,763 B2 | 11/2011 | Brykalski et al. | |
| 8,104,295 B2 | 1/2012 | Lofy | |
| 8,143,554 B2 | 3/2012 | Lofy | |
| 8,181,290 B2 | 5/2012 | Brykalski et al. | |
| 8,191,187 B2 | 6/2012 | Brykalski et al. | |
| 8,222,511 B2 | 7/2012 | Lofy | |
| 8,256,236 B2 | 9/2012 | Lofy | |
| 8,332,975 B2 | 12/2012 | Brykalski et al. | |
| 8,397,518 B1 | 3/2013 | Vistakula | |
| 8,402,579 B2 | 3/2013 | Marquette et al. | |
| 8,418,286 B2 | 4/2013 | Brykalski et al. | |
| 8,434,314 B2 | 5/2013 | Comiskey et al. | |
| 8,438,863 B2 | 5/2013 | Lofy | |
| RE44,272 E | 6/2013 | Bell | |
| 8,500,194 B2 | 8/2013 | Fischer et al. | |
| 8,505,320 B2 | 8/2013 | Lofy | |
| 8,516,842 B2 | 8/2013 | Petrovski | |
| 8,539,624 B2 | 9/2013 | Terech et al. | |
| 8,575,518 B2 | 11/2013 | Walsh | |
| 8,621,687 B2 | 1/2014 | Brykalski et al. | |
| 8,640,466 B2 * | 2/2014 | Bell | F25B 21/02 |
| | | | 62/3.2 |
| 8,653,763 B2 | 2/2014 | Lin et al. | |
| 8,678,492 B2 | 3/2014 | Benton | |
| 8,732,874 B2 | 5/2014 | Brykalski et al. | |
| 8,777,320 B2 | 7/2014 | Stoll et al. | |
| 8,782,830 B2 | 7/2014 | Brykalski et al. | |
| 8,869,596 B2 | 10/2014 | Hagl | |
| 8,893,329 B2 | 11/2014 | Petrovksi | |
| 8,893,513 B2 | 11/2014 | June et al. | |
| 9,027,360 B2 | 5/2015 | Chainer et al. | |
| 9,105,808 B2 | 8/2015 | Petrovksi | |
| 9,105,809 B2 | 8/2015 | Lofy | |
| 9,121,414 B2 | 9/2015 | Lofy et al. | |
| 9,125,497 B2 | 9/2015 | Brykalski et al. | |
| 9,310,112 B2 | 4/2016 | Bell et al. | |
| 9,335,073 B2 | 5/2016 | Lofy | |
| 9,445,524 B2 | 9/2016 | Lofy et al. | |
| 9,451,723 B2 | 9/2016 | Lofy et al. | |
| 9,603,459 B2 | 3/2017 | Brykalski et al. | |
| 9,622,588 B2 | 4/2017 | Brykalski et al. | |
| 9,651,279 B2 | 5/2017 | Lofy | |
| 9,662,962 B2 | 5/2017 | Steinman et al. | |
| 9,685,599 B2 | 6/2017 | Petrovski et al. | |
| 9,719,701 B2 | 8/2017 | Bell et al. | |
| 9,814,641 B2 | 11/2017 | Brykalski et al. | |
| 9,857,107 B2 | 1/2018 | Inaba et al. | |
| 9,958,190 B2 * | 5/2018 | West | F25B 49/02 |
| 9,989,267 B2 | 6/2018 | Brykalski et al. | |
| 10,005,337 B2 | 6/2018 | Petrovski | |
| 10,160,356 B2 | 12/2018 | Lofy et al. | |
| 10,179,966 B2 * | 1/2019 | Kim | D06F 58/26 |
| 10,208,990 B2 | 2/2019 | Petrovski et al. | |
| 10,219,323 B2 | 2/2019 | Inaba et al. | |
| 10,228,166 B2 | 3/2019 | Lofy | |
| 10,266,031 B2 | 4/2019 | Steinman et al. | |
| 10,288,084 B2 | 5/2019 | Lofy et al. | |
| 10,290,796 B2 | 5/2019 | Boukai et al. | |
| 10,295,201 B2 * | 5/2019 | Wang | F24F 1/0314 |
| 10,405,667 B2 | 9/2019 | Marquette et al. | |
| 10,457,173 B2 | 10/2019 | Lofy et al. | |
| 10,495,322 B2 | 12/2019 | Brykalski et al. | |
| 10,558,229 B2 * | 2/2020 | Kates | G01N 15/0826 |
| 10,647,230 B2 | 5/2020 | Fujii et al. | |
| 10,647,232 B2 | 5/2020 | Lofy et al. | |
| 10,773,617 B2 | 9/2020 | Zhang | |
| 10,991,869 B2 | 4/2021 | Jovovic et al. | |
| 11,033,058 B2 | 6/2021 | Cauchy | |
| 11,075,331 B2 | 7/2021 | Bück | |
| 11,148,505 B2 * | 10/2021 | Neumeister | H10N 10/17 |
| 11,152,557 B2 | 10/2021 | Jovovic et al. | |
| 11,223,004 B2 | 1/2022 | Jovovic | |
| 11,408,438 B2 | 8/2022 | Lofy et al. | |
| 11,639,816 B2 | 5/2023 | Cauchy | |
| 11,659,939 B2 | 5/2023 | Amman et al. | |
| 11,761,647 B2 * | 9/2023 | Baverstock | F28D 7/0008 |
| | | | 62/3.2 |
| 11,774,128 B2 * | 10/2023 | Costa | F25B 49/005 |
| | | | 702/184 |
| 11,780,353 B2 | 10/2023 | Sato et al. | |
| 11,857,004 B2 | 1/2024 | Cauchy | |

(56) References Cited

U.S. PATENT DOCUMENTS

| | | | |
|---|---|---|---|
| 11,993,132 B2 | 5/2024 | Pacilli et al. | |
| 12,025,151 B2 | 7/2024 | Lofy et al. | |
| 12,365,276 B2 * | 7/2025 | Yoo | B60N 2/5635 |
| 2001/0005990 A1 | 7/2001 | Kim et al. | |
| 2001/0014212 A1 | 8/2001 | Rutherford | |
| 2001/0028185 A1 | 10/2001 | Stowe et al. | |
| 2002/0017102 A1 | 2/2002 | Bell | |
| 2002/0026226 A1 | 2/2002 | Ein | |
| 2002/0062854 A1 | 5/2002 | Sharp | |
| 2002/0092308 A1 | 7/2002 | Bell | |
| 2002/0100121 A1 | 8/2002 | Kocurek | |
| 2002/0108380 A1 | 8/2002 | Nelsen et al. | |
| 2002/0121094 A1 | 9/2002 | VanHoudt | |
| 2002/0171132 A1 | 11/2002 | Buchwalter et al. | |
| 2002/0195844 A1 | 12/2002 | Hipwell | |
| 2003/0039298 A1 | 2/2003 | Eriksson et al. | |
| 2003/0041892 A1 | 3/2003 | Fleurial et al. | |
| 2003/0070235 A1 | 4/2003 | Suzuki et al. | |
| 2003/0084511 A1 | 5/2003 | Salvatini et al. | |
| 2003/0110779 A1 | 6/2003 | Otey et al. | |
| 2003/0133492 A1 | 7/2003 | Watanabe | |
| 2003/0145380 A1 | 8/2003 | Schmid | |
| 2003/0150060 A1 | 8/2003 | Huang | |
| 2003/0160479 A1 | 8/2003 | Minuth et al. | |
| 2003/0188382 A1 | 10/2003 | Klamm et al. | |
| 2003/0234247 A1 | 12/2003 | Stern | |
| 2004/0090093 A1 | 5/2004 | Kamiya et al. | |
| 2004/0098991 A1 | 5/2004 | Heyes | |
| 2004/0113549 A1 | 6/2004 | Roberts et al. | |
| 2004/0139758 A1 | 7/2004 | Kamiya et al. | |
| 2004/0164594 A1 | 8/2004 | Stoewe et al. | |
| 2004/0177622 A1 | 9/2004 | Harvie | |
| 2004/0177876 A1 | 9/2004 | Hightower | |
| 2004/0177877 A1 | 9/2004 | Hightower | |
| 2004/0191060 A1 | 9/2004 | Chiu et al. | |
| 2004/0195870 A1 | 10/2004 | Bohlender | |
| 2004/0238022 A1 | 12/2004 | Hiller et al. | |
| 2004/0255364 A1 | 12/2004 | Feher | |
| 2004/0264009 A1 | 12/2004 | Hwang et al. | |
| 2005/0000558 A1 | 1/2005 | Moriyama et al. | |
| 2005/0011009 A1 | 1/2005 | Wu | |
| 2005/0012204 A1 | 1/2005 | Strnad | |
| 2005/0045702 A1 | 3/2005 | Freeman et al. | |
| 2005/0056310 A1 | 3/2005 | Shikata et al. | |
| 2005/0067862 A1 | 3/2005 | Iqbal et al. | |
| 2005/0072165 A1 | 4/2005 | Bell | |
| 2005/0076944 A1 | 4/2005 | Kanatzidis et al. | |
| 2005/0078451 A1 | 4/2005 | Sauciuc et al. | |
| 2005/0086739 A1 | 4/2005 | Wu | |
| 2005/0121065 A1 | 6/2005 | Otey | |
| 2005/0126184 A1 | 6/2005 | Cauchy | |
| 2005/0140180 A1 | 6/2005 | Hesch | |
| 2005/0143797 A1 | 6/2005 | Parish et al. | |
| 2005/0145285 A1 | 7/2005 | Extrand | |
| 2005/0161072 A1 | 7/2005 | Esser et al. | |
| 2005/0173950 A1 | 8/2005 | Bajic et al. | |
| 2005/0183763 A1 | 8/2005 | Christiansen | |
| 2005/0193742 A1 | 9/2005 | Arnold | |
| 2005/0200166 A1 | 9/2005 | Noh | |
| 2005/0202774 A1 | 9/2005 | Lipke | |
| 2005/0220167 A1 | 10/2005 | Kanai et al. | |
| 2005/0251120 A1 | 11/2005 | Anderson et al. | |
| 2005/0257532 A1 | 11/2005 | Ikeda et al. | |
| 2005/0259394 A1 | 11/2005 | Lin | |
| 2005/0268956 A1 | 12/2005 | Take | |
| 2005/0278863 A1 | 12/2005 | Bahash et al. | |
| 2005/0285438 A1 | 12/2005 | Ishima et al. | |
| 2005/0288749 A1 | 12/2005 | Lachenbruch | |
| 2006/0005548 A1 | 1/2006 | Ruckstuhl | |
| 2006/0005944 A1 | 1/2006 | Wang et al. | |
| 2006/0053529 A1 | 3/2006 | Feher | |
| 2006/0060344 A1 | 3/2006 | Esaki | |
| 2006/0075760 A1 | 4/2006 | Im et al. | |
| 2006/0078319 A1 | 4/2006 | Maran | |
| 2006/0080778 A1 | 4/2006 | Chambers | |
| 2006/0087160 A1 | 4/2006 | Dong et al. | |
| 2006/0102224 A1 | 5/2006 | Chen et al. | |
| 2006/0118158 A1 | 6/2006 | Zhang et al. | |
| 2006/0123799 A1 | 6/2006 | Tateyama et al. | |
| 2006/0137099 A1 | 6/2006 | Feher | |
| 2006/0157102 A1 | 7/2006 | Nakajima et al. | |
| 2006/0158011 A1 | 7/2006 | Marlovits et al. | |
| 2006/0162074 A1 | 7/2006 | Bader | |
| 2006/0162341 A1 | 7/2006 | Milazzo | |
| 2006/0175877 A1 | 8/2006 | Alionte et al. | |
| 2006/0197363 A1 | 9/2006 | Lofy et al. | |
| 2006/0200398 A1 | 9/2006 | Botton et al. | |
| 2006/0201161 A1 | 9/2006 | Hirai et al. | |
| 2006/0201162 A1 | 9/2006 | Hsieh | |
| 2006/0213682 A1 | 9/2006 | Moon et al. | |
| 2006/0214480 A1 | 9/2006 | Terech | |
| 2006/0219699 A1 | 10/2006 | Geisel et al. | |
| 2006/0225441 A1 | 10/2006 | Goenka et al. | |
| 2006/0225773 A1 | 10/2006 | Venkatasubramanian et al. | |
| 2006/0237166 A1 | 10/2006 | Otey et al. | |
| 2006/0243317 A1 | 11/2006 | Venkatasubramanian | |
| 2006/0244289 A1 | 11/2006 | Bedro | |
| 2006/0254284 A1 | 11/2006 | Ito et al. | |
| 2006/0273646 A1 | 12/2006 | Comiskey et al. | |
| 2006/0289051 A1 | 12/2006 | Niimi et al. | |
| 2007/0017666 A1 | 1/2007 | Goenka et al. | |
| 2007/0035162 A1 | 2/2007 | Bier et al. | |
| 2007/0040421 A1 | 2/2007 | Zuzga et al. | |
| 2007/0069554 A1 | 3/2007 | Comiskey et al. | |
| 2007/0086757 A1 | 4/2007 | Feher | |
| 2007/0089773 A1 | 4/2007 | Koester et al. | |
| 2007/0095378 A1 | 5/2007 | Ito et al. | |
| 2007/0095383 A1 | 5/2007 | Tajima | |
| 2007/0101602 A1 | 5/2007 | Bae et al. | |
| 2007/0101729 A1 | 5/2007 | Aoki et al. | |
| 2007/0107450 A1 | 5/2007 | Sasao et al. | |
| 2007/0138844 A1 | 6/2007 | Kim | |
| 2007/0142883 A1 | 6/2007 | Quincy, III | |
| 2007/0145808 A1 | 6/2007 | Minuth et al. | |
| 2007/0157630 A1 | 7/2007 | Kadle et al. | |
| 2007/0157631 A1 | 7/2007 | Huang et al. | |
| 2007/0158981 A1 | 7/2007 | Almasi et al. | |
| 2007/0163269 A1 | 7/2007 | Chung et al. | |
| 2007/0190712 A1 | 8/2007 | Lin et al. | |
| 2007/0193279 A1 | 8/2007 | Yoneno et al. | |
| 2007/0194668 A1 | 8/2007 | Teshima et al. | |
| 2007/0200398 A1 | 8/2007 | Wolas et al. | |
| 2007/0214956 A1 | 9/2007 | Carlson et al. | |
| 2007/0220907 A1 | 9/2007 | Ehlers | |
| 2007/0227158 A1 | 10/2007 | Kuchimachi | |
| 2007/0234742 A1 | 10/2007 | Aoki et al. | |
| 2007/0241592 A1 | 10/2007 | Giffin et al. | |
| 2007/0251016 A1 | 11/2007 | Feher | |
| 2007/0256722 A1 | 11/2007 | Kondoh | |
| 2007/0261412 A1 | 11/2007 | Heine | |
| 2007/0261413 A1 | 11/2007 | Hatamian et al. | |
| 2007/0261548 A1 | 11/2007 | Vrzalik et al. | |
| 2007/0262621 A1 | 11/2007 | Dong et al. | |
| 2007/0296251 A1 | 12/2007 | Krobok et al. | |
| 2008/0000025 A1 | 1/2008 | Feher | |
| 2008/0000511 A1 | 1/2008 | Kuroyanagi et al. | |
| 2008/0022694 A1 | 1/2008 | Anderson et al. | |
| 2008/0023056 A1 | 1/2008 | Kambe et al. | |
| 2008/0028536 A1 | 2/2008 | Hadden-Cook | |
| 2008/0028768 A1 | 2/2008 | Goenka | |
| 2008/0028769 A1 | 2/2008 | Goenka | |
| 2008/0053108 A1 | 3/2008 | Wen | |
| 2008/0053509 A1 | 3/2008 | Flitsch et al. | |
| 2008/0077211 A1 | 3/2008 | Levinson et al. | |
| 2008/0078186 A1 | 4/2008 | Cao | |
| 2008/0084095 A1 | 4/2008 | Wolas | |
| 2008/0087316 A1 | 4/2008 | Inaba et al. | |
| 2008/0124234 A1 | 5/2008 | Echazarreta | |
| 2008/0154518 A1 | 6/2008 | Manaka et al. | |
| 2008/0155990 A1 | 7/2008 | Gupta et al. | |
| 2008/0163916 A1 | 7/2008 | Tsuneoka et al. | |
| 2008/0164733 A1 | 7/2008 | Giffin et al. | |
| 2008/0166224 A1 | 7/2008 | Giffin et al. | |
| 2008/0245092 A1 | 10/2008 | Forsberg et al. | |

(56) References Cited

U.S. PATENT DOCUMENTS

| | | |
|---|---|---|
| 2008/0263776 A1 | 10/2008 | O'Reagan |
| 2008/0289677 A1 | 11/2008 | Bell et al. |
| 2008/0307796 A1 | 12/2008 | Bell et al. |
| 2009/0000031 A1 | 1/2009 | Feher |
| 2009/0015042 A1 | 1/2009 | Bargheer et al. |
| 2009/0026813 A1 | 1/2009 | Lofy |
| 2009/0031742 A1 | 2/2009 | Seo et al. |
| 2009/0033130 A1 | 2/2009 | Marquette et al. |
| 2009/0106907 A1 | 4/2009 | Chambers |
| 2009/0108094 A1 | 4/2009 | Ivri |
| 2009/0121524 A1 | 5/2009 | Abe et al. |
| 2009/0126110 A1 | 5/2009 | Feher |
| 2009/0151909 A1 | 6/2009 | Yang |
| 2009/0178700 A1 | 7/2009 | Heremans et al. |
| 2009/0203120 A1 | 8/2009 | Shin et al. |
| 2009/0211619 A1 | 8/2009 | Sharp et al. |
| 2009/0218855 A1 | 9/2009 | Wolas |
| 2009/0235969 A1 | 9/2009 | Heremans et al. |
| 2009/0250980 A1 | 10/2009 | Major et al. |
| 2009/0263242 A1 | 10/2009 | Winkler et al. |
| 2009/0269584 A1 | 10/2009 | Bell et al. |
| 2009/0293488 A1 | 12/2009 | Coughlan, III et al. |
| 2010/0031987 A1 | 2/2010 | Bell et al. |
| 2010/0132379 A1 | 6/2010 | Wu |
| 2010/0132380 A1 | 6/2010 | Robinson, II |
| 2010/0133883 A1 | 6/2010 | Walker |
| 2010/0153066 A1 | 6/2010 | Federer et al. |
| 2010/0154437 A1 | 6/2010 | Nepsha |
| 2010/0154911 A1 | 6/2010 | Yoskowitz |
| 2010/0198322 A1 | 8/2010 | Joseph et al. |
| 2010/0303647 A1 | 12/2010 | Ida et al. |
| 2010/0307168 A1 | 12/2010 | Kohl et al. |
| 2011/0017421 A1 | 1/2011 | Esaki |
| 2011/0061400 A1 | 3/2011 | Park et al. |
| 2011/0061401 A1 | 3/2011 | Jun et al. |
| 2011/0061403 A1 | 3/2011 | Jun et al. |
| 2011/0066217 A1 | 3/2011 | Diller et al. |
| 2011/0101741 A1 | 5/2011 | Kolich |
| 2011/0192173 A1 | 8/2011 | Walter et al. |
| 2011/0271994 A1 | 11/2011 | Gilley |
| 2011/0289684 A1 | 12/2011 | Parish et al. |
| 2012/0000901 A1 | 1/2012 | Bajic et al. |
| 2012/0003510 A1 | 1/2012 | Eisenhour |
| 2012/0017371 A1 | 1/2012 | Pollard |
| 2012/0080911 A1 | 4/2012 | Brykalski et al. |
| 2012/0132242 A1 | 5/2012 | Chu et al. |
| 2012/0144844 A1 | 6/2012 | Park et al. |
| 2012/0145215 A1 | 6/2012 | Hwang et al. |
| 2012/0174956 A1 | 7/2012 | Smythe et al. |
| 2012/0198616 A1 | 8/2012 | Makansi et al. |
| 2012/0201008 A1 | 8/2012 | Hershberger et al. |
| 2012/0235444 A1 | 9/2012 | Dilley et al. |
| 2012/0239123 A1 | 9/2012 | Weber et al. |
| 2012/0256451 A1 | 10/2012 | Sahashi |
| 2012/0261399 A1 | 10/2012 | Lofy |
| 2012/0289761 A1 | 11/2012 | Boyden et al. |
| 2012/0325281 A1 | 12/2012 | Akiyama |
| 2013/0008181 A1 | 1/2013 | Makansi et al. |
| 2013/0028765 A1 | 1/2013 | Yokozawa et al. |
| 2013/0097777 A1 | 4/2013 | Marquette et al. |
| 2013/0113239 A1 | 5/2013 | Akaike et al. |
| 2013/0125563 A1 | 5/2013 | Jun |
| 2013/0200424 A1 | 8/2013 | An et al. |
| 2013/0232996 A1 | 9/2013 | Goenka et al. |
| 2013/0239592 A1 | 9/2013 | Lofy |
| 2014/0014871 A1 | 1/2014 | Haddon et al. |
| 2014/0026320 A1 | 1/2014 | Marquette et al. |
| 2014/0030082 A1 | 1/2014 | Helmenstein |
| 2014/0090513 A1 | 4/2014 | Zhang et al. |
| 2014/0113536 A1 | 4/2014 | Goenka et al. |
| 2014/0131343 A1 | 5/2014 | Walsh |
| 2014/0137569 A1 | 5/2014 | Parish et al. |
| 2014/0159442 A1 | 6/2014 | Helmenstein |
| 2014/0165608 A1 | 6/2014 | Tseng |
| 2014/0180493 A1 | 6/2014 | Csonti et al. |
| 2014/0182646 A1 | 7/2014 | Choi et al. |
| 2014/0187140 A1 | 7/2014 | Lazanja et al. |
| 2014/0194959 A1 | 7/2014 | Fries et al. |
| 2014/0230455 A1 | 8/2014 | Chandler et al. |
| 2014/0250918 A1 | 9/2014 | Lofy |
| 2014/0256244 A1 | 9/2014 | Sakurai et al. |
| 2014/0260331 A1 | 9/2014 | Lofy et al. |
| 2014/0305625 A1 | 10/2014 | Petrovski |
| 2014/0338366 A1 | 11/2014 | Adldinger et al. |
| 2015/0033764 A1 | 2/2015 | Gurevich et al. |
| 2015/0116943 A1 | 4/2015 | Olsson et al. |
| 2015/0118482 A1 | 4/2015 | Kagawa |
| 2015/0165865 A1 | 6/2015 | Park et al. |
| 2015/0217665 A1 | 8/2015 | Hickey et al. |
| 2015/0231636 A1 | 8/2015 | Lim et al. |
| 2015/0238020 A1 | 8/2015 | Petrovski et al. |
| 2015/0298524 A1 | 10/2015 | Goenka |
| 2016/0030234 A1 | 2/2016 | Lofy et al. |
| 2016/0031348 A1 | 2/2016 | Kurosawa et al. |
| 2016/0035957 A1 | 2/2016 | Casey |
| 2016/0039321 A1 | 2/2016 | Dacosta-Mallet et al. |
| 2016/0133817 A1 | 5/2016 | Makansi et al. |
| 2016/0280038 A1 | 9/2016 | Tanaka et al. |
| 2016/0325657 A1 | 11/2016 | Zhang et al. |
| 2017/0047500 A1 | 2/2017 | Shiraishi et al. |
| 2017/0066355 A1 | 3/2017 | Kozlowski |
| 2017/0071359 A1 | 3/2017 | Petrovski et al. |
| 2017/0200992 A1 | 7/2017 | Piggott et al. |
| 2017/0268803 A1 | 9/2017 | Cauchy |
| 2017/0365764 A1 | 12/2017 | Shingai et al. |
| 2018/0111527 A1 | 4/2018 | Tait et al. |
| 2018/0123013 A1 | 5/2018 | Williams et al. |
| 2018/0170223 A1 | 6/2018 | Wolas |
| 2018/0172325 A1 | 6/2018 | Inaba et al. |
| 2018/0251008 A1 | 9/2018 | Androulakis et al. |
| 2018/0279416 A1 | 9/2018 | Sajic et al. |
| 2018/0290574 A1 | 10/2018 | Kozlowski |
| 2019/0051807 A1 | 2/2019 | Okumura et al. |
| 2019/0086133 A1* | 3/2019 | Popli ............... F24F 11/77 |
| 2019/0268975 A1 | 8/2019 | Kim |
| 2019/0331380 A1* | 10/2019 | Seiler ............... F25B 39/04 |
| 2020/0035898 A1 | 1/2020 | Jovovic et al. |
| 2021/0370746 A1 | 12/2021 | Pacilli et al. |
| 2022/0000191 A1 | 1/2022 | Cauchy |
| 2022/0169158 A1 | 6/2022 | Cauchy |
| 2022/0381262 A1 | 12/2022 | Lofy et al. |
| 2024/0123791 A1 | 4/2024 | Turner et al. |
| 2024/0239154 A1 | 7/2024 | Pacilli et al. |
| 2024/0288005 A1 | 8/2024 | Lofy et al. |

FOREIGN PATENT DOCUMENTS

| | | |
|---|---|---|
| CN | 2155318 | 2/1994 |
| CN | 1299950 | 6/2001 |
| CN | 1320087 | 10/2001 |
| CN | 1513699 | 7/2004 |
| CN | 1535220 | 10/2004 |
| CN | 1929761 | 3/2007 |
| CN | 101 033 878 | 9/2007 |
| CN | 101 097 986 | 1/2008 |
| CN | 101 219 025 | 7/2008 |
| CN | 101 332 785 | 12/2008 |
| CN | 102 019 866 | 4/2011 |
| CN | 102 801 105 | 11/2012 |
| CN | 104 282 643 | 1/2015 |
| CN | 204 157 198 | 2/2015 |
| CN | 106 937 799 | 7/2017 |
| CN | 108 778 802 | 11/2018 |
| CN | 208 355 060 | 1/2019 |
| CN | 111 306 838 | 6/2020 |
| CZ | 288460 | 6/2001 |
| DE | 195 03 291 | 8/1996 |
| DE | 199 12 764 | 9/2000 |
| DE | 299 11 519 | 11/2000 |
| DE | 102 38 552 | 8/2001 |
| DE | 101 15 242 | 10/2002 |
| DE | 202 17 645 | 3/2003 |
| DE | 201 20 516 | 4/2003 |
| DE | 10 2009 036 332 | 2/2011 |

(56) References Cited

FOREIGN PATENT DOCUMENTS

| | | |
|---|---|---|
| DE | 10 2018 203 701 | 9/2018 |
| EP | 0 424 160 | 4/1991 |
| EP | 0 411 375 | 5/1994 |
| EP | 0 621 026 | 10/1994 |
| EP | 0 834 421 | 4/1998 |
| EP | 0 862 901 | 9/1998 |
| EP | 1 486 143 | 12/2004 |
| EP | 1 598 223 | 11/2005 |
| EP | 1 972 312 | 9/2008 |
| EP | 1 845 914 | 9/2009 |
| EP | 2 098 733 | 9/2009 |
| EP | 2 396 619 | 8/2015 |
| EP | 2 921 083 | 9/2015 |
| FR | 2 882 307 | 8/2006 |
| FR | 2 893 826 | 6/2007 |
| GB | 874660 | 8/1961 |
| GB | 978057 | 12/1964 |
| GB | 1 435 831 | 5/1976 |
| JP | 56-097416 | 8/1981 |
| JP | 60-080044 | 5/1985 |
| JP | 60-085297 | 5/1985 |
| JP | 01-281344 | 11/1989 |
| JP | 04-052470 | 6/1990 |
| JP | 04-165234 | 6/1992 |
| JP | 05-026762 | 2/1993 |
| JP | 05-069731 A | 3/1993 |
| JP | 05-147423 | 6/1993 |
| JP | 05-277020 | 10/1993 |
| JP | 10-044756 | 2/1998 |
| JP | 10-227508 | 8/1998 |
| JP | 10-297243 | 11/1998 |
| JP | 10-297274 | 11/1998 |
| JP | 10-332883 | 12/1998 |
| JP | 2000-060681 | 2/2000 |
| JP | 2000-164945 | 6/2000 |
| JP | 2000-244024 | 9/2000 |
| JP | 2000-325384 | 11/2000 |
| JP | 2001-174028 | 6/2001 |
| JP | 2001-208405 | 8/2001 |
| JP | 2002-514735 | 5/2002 |
| JP | 2002-227798 | 8/2002 |
| JP | 2002-234332 | 8/2002 |
| JP | 2003-042594 | 2/2003 |
| JP | 2003-174203 | 6/2003 |
| JP | 2003-204087 | 7/2003 |
| JP | 2003-254636 | 9/2003 |
| JP | 2004-017855 | 1/2004 |
| JP | 2004-055621 | 2/2004 |
| JP | 2004-079883 | 3/2004 |
| JP | 2004-174138 | 6/2004 |
| JP | 2005-079210 | 2/2005 |
| JP | 2005-251950 | 9/2005 |
| JP | 2005-303183 | 10/2005 |
| JP | 2005-333083 | 12/2005 |
| JP | 2006-001392 | 1/2006 |
| JP | 2006-021572 | 1/2006 |
| JP | 2006-069376 | 3/2006 |
| JP | 2006-076398 | 3/2006 |
| JP | 2006-123874 | 5/2006 |
| JP | 2006-341841 | 12/2006 |
| JP | 2007-506523 | 3/2007 |
| JP | 2007-506526 | 3/2007 |
| JP | 2007-126047 | 5/2007 |
| JP | 2007-240046 | 9/2007 |
| JP | 2008-012498 | 1/2008 |
| JP | 2008-529894 | 8/2008 |
| JP | 2008-274790 | 11/2008 |
| JP | 2009-077760 | 4/2009 |
| JP | 2010-000253 | 1/2010 |
| JP | 2010-052494 | 3/2010 |
| JP | 2011-189764 | 9/2011 |
| JP | 2013-184588 | 9/2013 |
| JP | 2013-203196 | 10/2013 |
| JP | 2014-135455 | 7/2014 |
| JP | 2017-518912 | 7/2017 |
| JP | 2017-171129 | 9/2017 |
| JP | 2018-012498 | 1/2018 |
| KR | 10-2001-0060500 | 7/2001 |
| KR | 10-2005-0011494 | 1/2005 |
| KR | 10-2012-0100237 | 9/2012 |
| KR | 10-1524090 | 5/2015 |
| KR | 10-1873857 | 7/2018 |
| LU | 66619 | 2/1973 |
| RU | 2562507 | 9/2015 |
| WO | WO 94/20801 | 9/1994 |
| WO | WO 95/14899 | 6/1995 |
| WO | WO 95/31688 | 11/1995 |
| WO | WO 96/05475 | 2/1996 |
| WO | WO 98/07898 | 2/1998 |
| WO | WO 98/31311 | 7/1998 |
| WO | WO 99/23980 | 5/1999 |
| WO | WO 99/44552 | 9/1999 |
| WO | WO 99/58907 | 11/1999 |
| WO | WO 02/11968 | 2/2002 |
| WO | WO 02/053400 | 7/2002 |
| WO | WO 02/058165 | 7/2002 |
| WO | WO 03/014634 | 2/2003 |
| WO | WO 03/051666 | 6/2003 |
| WO | WO 03/063257 | 7/2003 |
| WO | WO 2004/011861 | 2/2004 |
| WO | WO 2005/065987 | 7/2005 |
| WO | WO 2005/073021 | 8/2005 |
| WO | WO 2005/105516 | 11/2005 |
| WO | WO 2005/115794 | 12/2005 |
| WO | WO 2006/037178 | 4/2006 |
| WO | WO 2006/041935 | 4/2006 |
| WO | WO 2006/078394 | 7/2006 |
| WO | WO 2006/102509 | 9/2006 |
| WO | WO 2006/117690 | 11/2006 |
| WO | WO 2007/060371 | 5/2007 |
| WO | WO 2007/089789 | 8/2007 |
| WO | WO 2008/023942 | 2/2008 |
| WO | WO 2008/045964 | 4/2008 |
| WO | WO 2008/046110 | 4/2008 |
| WO | WO 2008/057962 | 5/2008 |
| WO | WO 2008/076588 | 6/2008 |
| WO | WO 2008/086499 | 7/2008 |
| WO | WO 2008/115831 | 9/2008 |
| WO | WO 2009/015235 | 1/2009 |
| WO | WO 2009/036077 | 3/2009 |
| WO | WO 2009/097572 | 8/2009 |
| WO | WO 2010/009422 | 1/2010 |
| WO | WO 2010/088405 | 8/2010 |
| WO | WO 2010/129803 | 11/2010 |
| WO | WO 2011/026040 | 3/2011 |
| WO | WO 2011/156643 | 12/2011 |
| WO | WO 2012/061777 | 5/2012 |
| WO | WO 2013/052823 | 4/2013 |
| WO | WO 2013/151903 | 10/2013 |
| WO | WO 2014/164887 | 10/2014 |
| WO | WO 2015/171901 | 11/2015 |
| WO | WO 2016/077843 | 5/2016 |
| WO | WO 2017/059256 | 4/2017 |
| WO | WO 2017/066261 | 4/2017 |
| WO | WO 2017/083308 | 5/2017 |
| WO | WO 2017/086043 | 5/2017 |
| WO | WO 2017/100718 | 6/2017 |
| WO | WO 2017/136793 | 8/2017 |
| WO | WO 2017/145630 | 8/2017 |
| WO | WO 2017/163580 | 9/2017 |
| WO | WO 2018/175506 | 9/2018 |
| WO | WO 2019/173553 | 9/2019 |
| WO | WO 2019/226968 | 11/2019 |
| WO | WO 2020/112902 | 6/2020 |
| WO | WO 2020/172255 | 8/2020 |
| WO | WO 2020/180632 | 9/2020 |
| WO | WO 2021/025663 | 2/2021 |
| WO | WO 2022/198216 | 9/2022 |
| WO | WO 2022/198217 | 9/2022 |

OTHER PUBLICATIONS

U.S. Appl. No. 15/685,912, filed Aug. 24, 2017, Petrovski et al.
U.S. Appl. No. 16/277,765, filed Feb. 15, 2019, Petrovski et al.

(56) References Cited

OTHER PUBLICATIONS

U.S. Appl. No. 18/310,474, filed May 1, 2023, Cauchy.
Feher, S., "Thermoelectric Air Conditioned Variable Temperature Seat (VTS) & Effect Upon VehicleOccupant Comfort, Vehicle Energy Efficiency, and Vehicle Environment Compatibility", SAE Technical Paper, Apr. 1993, pp. 341-349.
Geng, S. et al., *Modern Family Practical Encyclopedia*, Jilin Science and Technology Press, Sep. 1985, p. 679.
Lofy, J., et al., "Thermoelectrics for Environmental Control in Automobiles", Proceeding of Twenty-First International Conference on Thermoelectrics (ICT 2002), 2002, pp. 471-476.
Luo, Z., "A Simple Method to Estimate the Physical Characteristics of a Thermoelectric Cooler from Vendor Datasheets", Electronics Cooling, Aug. 2008, in 17 pages from https://www.electronics-cooling.com/2008/08/a-simple-method-to-estimate-the-physical-characteristics-of-a-thermoelectric-cooler-from-vendor-datasheets/.
Photographs and accompanying description of climate control seat assembly system components publicly disclosed as early as Jan. 1998.
Photographs and accompanying description of a component of a climate control seat assembly system sold prior to Nov. 1, 2005.
Photographs and accompanying description of a component of a climate control seat assembly system sold prior to Dec. 20, 2003.
Zhou, Z. et al., "Design features of the air-conditioner used for elevators and a comparison betweentechniques for eliminating condensation water", Energy Research and Information, 2002, vol. 18, No. 3, pp. 156-161.
Chinese Office Action in Chinese Application No. 201811430679.2, dated Nov. 26, 2021.
International Search Report and Written Opinion received in PCT Application No. PCT/US2022/071181, dated Jun. 2, 2022.
International Preliminary Report on Patentability received in PCT Application No. PCT/US2022/071181 dated Sep. 28, 2023.

\* cited by examiner

OPTIMAL CONTROL OF CONVECTIVE THERMAL DEVICES

CROSS REFERENCE

This application claims the benefit of U.S. Patent Application No. 63/162,937, filed Mar. 18, 2021, the entirety of which is hereby incorporated by reference.

BACKGROUND

Field

This disclosure generally relates to systems and methods for control of thermoelectric climate conditioning systems.

Related Art

Climate control systems, such as heating systems and air conditioning systems, can be used to thermally condition extensive areas, such as entire buildings, suites, or individual rooms. The cabin space of a vehicle is also typically conditioned as a unit using conventional climate control systems. However, more selective environmental conditioning can also be desirable in many contexts such as, for example, the heating or cooling of a passenger seat in a vehicle. Accordingly, various types of individualized climate control systems for vehicle seats and other environments have been used.

SUMMARY

According to one aspect, a control method for a thermal conditionings system including a thermoelectric device (TED) includes providing power to the TED, providing an airflow across a main side of the TED with a blower at a first blower speed, calculating an operational parameter based at least on the power provided to the TED, and adjusting the airflow across the main side of the TED based on the operational parameter.

According to another aspect, the operational parameter is based on a heat transfer coefficient for a heat exchanger on the main side of the TED and a specific heat of the airflow. According to another aspect, the operational parameter is proportional to a cross-sectional area of a main side flow path of the TED. According to another aspect, the operational parameter is a mass flow rate of the airflow across the main side of the TED. According to another aspect, the mass flow rate is based on a heat transfer coefficient between the TED and the airflow. According to another aspect, the mass flow rate is based on optimizing a heat transfer rate between the TED and the airflow. According to another aspect, the heat transfer rate between the TED and the airflow is calculated based on, at least, an intake temperature of the airflow and a heat transfer coefficient of the TED. According to another aspect, the heat transfer rate between the TED and the airflow is calculated based on, at least, the power provided to the TED. The airflow is adjusted based on the operational parameter including adjusting a position of a flow control valve based on the operational parameter. The flow control valve is configured to divide the airflow between the main side and a waste side of the TED. According to another aspect, adjusting the airflow based on the operational parameter includes adjusting the first blower speed to a second blower speed. According to another aspect, the power provided to the TED is adjusted based on the operational parameter. According to another aspect, the power provided to the TED is adjusted such that a temperature of the TED matches a temperature of the airflow at an outlet of the thermal conditioning system. According to another aspect, the power provided to the TED is compared with an available power to the TED. The power provided the TED is increased to use the available power and the first blower speed is increased to a second blower speed to increase a thermal effect of the airflow. According to another aspect, the airflow, a position of the flow control valve, or the provided power to the TED is adjusted to avoid temperatures above a damaging threshold. According to another aspect, a temperature loss in the airflow between the main side of the TED and an end effector is estimated. The airflow, a position of the flow control valve, or the provided power is adjusted to avoid delivering overheated or undercooled air to the end effector. According to another aspect, the end effector is a surface of a vehicle seat, an occupant's skin, a device outlet, a footwell, or seatback. According to another aspect, the blower is not activated until the TED is capable of heating the airflow on the main side to above an acceptable temperature. According to another aspect, a humidity of the airflow is measured and a dew point of the airflow is calculated based on the measured humidity. The airflow, a flow control valve position, or the provided power is adjusted to avoid cooling the airflow below the dew point to avoid condensation within the thermal conditioning system. According to another aspect, the TED is in a heating mode and the airflow on a waste side is cooled. According to another aspect, is in a cooling mode and the airflow on the main side is cooled. According to another aspect, thermal conditioning system is disposed within a vehicle seat. According to another aspect, the airflow across a waste side of the TED is adjusted to control a delta temperature of the TED.

According to a second aspect, a control method for a thermal conditioning system including a thermoelectric device (TED) includes providing power to the TED, the TED including a main side and a waste side, providing an airflow with a blower at a first blower speed, adjusting a position of a flow control valve to divide the airflow between the main side and the waste side, the adjusted position of the flow control valve configured to achieve a setpoint temperature of the airflow. The position of the flow control valve is based on an optimal air mass flow rate across the main side of the TED to maximize a heat transfer rate from the TED to the airflow based on the provided power and the position of the flow control valve. The power to the TED achieves a temperature setpoint while maintaining the optimal air mass flow rate.

According to another aspect, the power delivered by the TED to the airflow is determined and compared with an available power from the TED. The airflow is increased by adjusting the blower to a second blower speed if there is more power available to the TED. The power to the TED is also increased. According to another aspect, the power comparison of the TED is based on a power capacity of the TED. According to another aspect, the temperatures of the TED on the main side and the waste side are estimated and the airflow, the position of the flow control valve, or the provided power is adjusted to avoid temperatures outside a specified operational range. According to another aspect, a temperature loss in the airflow between the main side of the TED and an end effector is estimated and the airflow, the position of the flow control valve, or the provided power is adjusted to avoid delivering over-heated or under-cooled air to the end effector. According to another aspect, the end effector is a surface of a vehicle seat. According to another aspect, the blower is not activated until the TED is capable of heating the airflow on the main side to above an acceptable temperature. According to another aspect, a humidity of the airflow is calculated including a dew point based on a measured humidity. The airflow, the position of the flow control valve, or the provided power is adjusted to avoid cooling the airflow below the dew point to avoid condensation within the thermal conditioning system.

According to a third aspect, a thermal conditioning system includes a thermoelectric device (TED) having a main side and a waste side. A blower is configured to provide an airflow. An adjustable flow control valve divides the airflow between a main side path across the main side of the TED and a waste side path across the waste side of the TED. At least one computer-readable memory has stored thereon executable instructions. One or more processors are in communication with the at least one computer-readable memory and configured to execute the instructions to cause the system to receive a signal indicating a power provided to the TED, receive a signal indicating a speed of the blower, receive a signal indicating a position of the flow control valve, determine an operational parameter of the thermal conditioning system based at least on the power provided to the TED and the position of the flow control valve, and send a control signal to modify the speed of the blower or the position of the flow control valve to adjust the operational parameter.

According to another aspect, the operational parameter is a mass flow rate based on a heat transfer rate from the TED to the airflow. According to another aspect, the mass flow rate is optimal for the heat transfer rate. According to another aspect, the instructions further cause the system to increase the power delivered by to the TED to achieve a temperature setpoint of the airflow. According to another aspect, the power delivered by the TED is increased to achieve the temperature setpoint optimizes the heat transfer rate. According to another aspect, the instructions further cause the system to compare the power delivered to the TED with an available power for the TED. According to another aspect, the instructions further cause the system to increase the speed of the blower and the power delivered to the TED. According to another aspect, the operational parameter is an efficiency power transferred from the TED to the airflow. According to another aspect, the operational parameter is a setpoint temperature of the airflow. According to another aspect, the instructions further cause the system to estimate a temperature of the TED on the main side and/or the waste side, and adjust the airflow, the position of the flow control valve, or the provided power to avoid temperatures above a damages threshold. According to another aspect, the instructions further cause the system to estimate a temperature loss in the airflow between the main side of the TED and an end effector, and adjust one of the airflow, the position of the flow control valve, or the provided power to avoid delivering over-heated or under-cooled air to the end effector. According to another aspect, the end effector is a surface of a vehicle seat. According to another aspect, the blower is not activated until the TED is capable of heating the airflow on the main side to above an acceptable temperature. According to another aspect, the instructions further cause the system to measure a humidity of the airflow, calculate a dew point of the airflow based on the measured humidity, and adjust the airflow, the position of the flow control valve, or the provided power to avoid cooling the airflow below the dew point to avoid condensation within the thermal conditioning system.

The foregoing summary is illustrative only and is not intended to be limiting. Other aspects, features, and advantages of the systems, devices, and methods and/or other subject matter described in this application will become apparent in the teachings set forth below. The summary is provided to introduce a selection of some of the concepts of this disclosure. The summary is not intended to identify key or essential features of any subject matter described herein

BRIEF DESCRIPTION OF THE DRAWINGS

Various examples are depicted in the accompanying drawings for illustrative purposes, and should in no way be interpreted as limiting the scope of the examples. Various features of different disclosed examples can be combined to form additional examples, which are part of this disclosure.

DETAILED DESCRIPTION

The various features and advantages of the systems, devices, and methods of the technology described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

Thermal Conditioning Systems

Existing gross climate control technologies can be used to provide air-conditioning and/or heating within a confined space such as a vehicle cabin. On the other hand, targeted climate control systems can be directed to specific locations to effect heating or cooling faster and/or more efficiently. Accordingly, one aspect of the present disclosure is the use of various procedures for effective and/or efficient use a thermal conditioning system.

Figure 1:
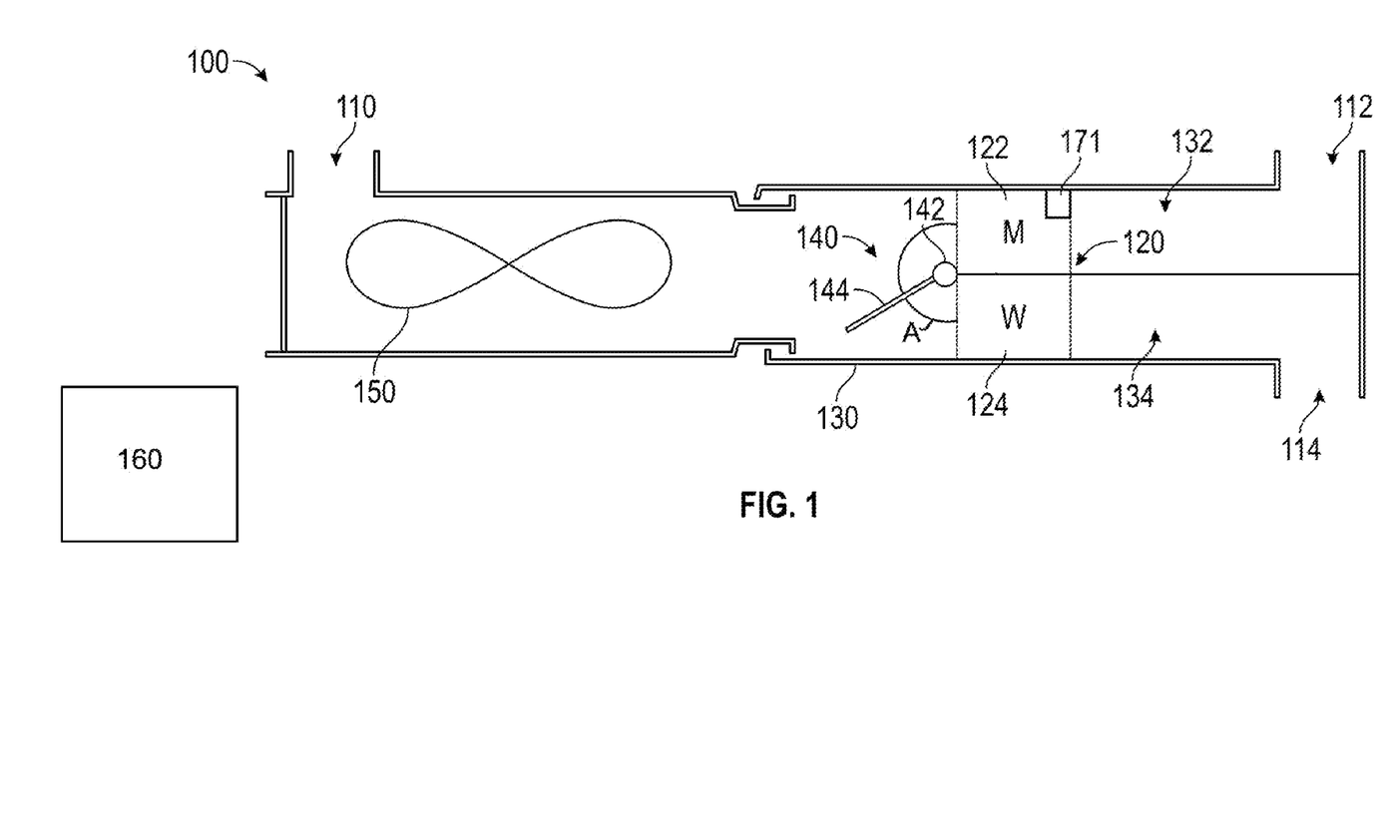
FIG. 1 shows a thermal conditioning system including a blower for providing an airflow across main and waste sides of a thermoelectric device (TED) and a flow control valve for dividing the air between the main and waste sides.

FIG. 1 shows an implementation of a thermal conditioning system 100 suitable for targeted use. The thermal conditioning system 100 can be used to deliver conditioned (e.g., heated, cooled, dried, and/or wetted) air to a climate-controlled device or environment. In an exemplary implementation, the thermal conditioning system 100 can deliver conditioned air into a vehicle seat, such as through one or more passages or channels within the vehicle seat. The thermal conditioning system 100 can also be used to provide conditioned air to various other spaces or components such as head rests, arm rests, an enclosed spaces, beds, furniture, or any touch surface that may benefit from thermal conditioning. Other implementations of thermal conditioning systems are described in WO 2020/112902, the entirety of which is hereby incorporated by reference.

The thermal conditioning system 100 can include a flow path therethrough. The flow path can extend through an outer housing 130 of the thermal conditioning system 100. The flow path can include an inlet 110 and one or more outlets 112, 114. Fluid, such as ambient air, can be drawn in through the inlet 110, conditioned using one or more conditioning elements within the system 100, and exhausted through the outlet(s) 112, 114, at least one of which provides conditioned air to the desired location.

The conditioning elements of the thermal conditioning system 100 can include a thermoelectric device (TED) 120. The TED 120 can be a Peltier device. The TED 120 can include a main-side 122 and a waste side 124. The flow path can include a main side flow path 132 that extends across the main side 122 of the TED 120 to the main outlet 112. The flow path can include a waste side flow path 134 that extends across the waste side 124 of the TED 120 to the waste outlet 114. The main-side flow path 132 can terminate at the climate-controlled environment or passageway thereto. The waste-side flow path 134 can terminate at an exhaust. The main and waste sides 122, 124 can each include a heat exchanger, such as one or more fins to enhance heat transfer between the TED 120 and the airflow passing along the respective main and/or waste side flow paths 132, 134.

The TED 120 can be connected with an voltage or amperage source such that the TED heats one side and cools the opposite side. Modification of the applied voltage or amperage can cause cooling of the main side 122 and heating of the waste side 124, or operated in the reverse polarity to cool the waste side 124 and heat the main side 122. When used as a cooling device, the main-side 122 can be colder than the waste side 124. When used as a heating device, the main-side 122 can be hotter than the waste side 124. The amount of power provided to the TED 120 can be adjusted using a duty cycle through pulse-width modulation (PWM). The TED 120 may include a temperature sensor 171, such as an NTC. The heat sensor may be located on the main side 122, such as on one of the fins.

The thermal conditioning system 100 can include or be used in combination with a blower 150, or other fluid moving device. The blower 150 can include a motor for driving one or more blades. A speed of the blower 150 can controlled based on application of a voltage and/or amperage to the motor. The blower 150 can deliver the airflow (e.g., ambient air or another fluid) along the flow path through the thermal conditioning system 100. The blower 150 can draw air in from the inlet 110 and move the air along the flow path past the TED 120 to outlets 112, 114. In the illustrated system 100, the blower 150 can be positioned, in general, upstream of the conditioning elements of the thermal conditioning system 100. However, in other implementations, a blower 150 can be positioned downstream of the conditioning elements in addition to or in the alternative to an upstream blower.

The thermal conditioning system 100 can include a flow control valve 140. The flow control valve 140 can divide and/or portion the airflow provided by the blower 150 between the main and waste-side flow paths 132, 134. The flow control valve 140 can be upstream of the TED 120. The flow control valve 140 can include a louver or flap 144. The flap 144 can be connected with a movable pivot 142. A position of the flap 144 and pivot 142 can be controlled by a motor (e.g., a servo, step, or other motor type) or other actuator. The flap 144 can be pivotable about the pivot 142 through an angle A. The angle A can vary to fully or partially close each of the main side flow path 132 and the waste side flow path 134. The effect of the position of the flap 144 on the temperature of the conditioned air at the outlet 112 is further described in WO 2020/112902.

In the illustrated implementation, the flow control valve 140 is in the form of a flap valve, however other types of valves could be used such as needle, barrel or rotary valves and/or a combination of such valves. Moreover, it is anticipated that in other implementations the flow control valve 140 can be positioned downstream of the TED 120 and/or that additional valves can be provided. For example, individual valves could be provided each of the main and waste side flow paths 132, 134.

The system 100 can further include or be connected with a controller 160. The controller 160 may include a singular unit or distributed across several devices. The controller 160 can include a processor and a non-transitory computer-readable storage medium (e.g., memory) such as a persistent magnetic storage drive, solid state drive, etc., configured to store instructions that are executable by the processor to operate the system 100 according to one or more control methods, as discussed further below. The execution of those instructions, whether the execution occurs in the processor or elsewhere, may control the entire system or sub-system(s) thereof. For example, when executed by a processor of the computer system, the instructions may cause the components of the system to operate. Operation of the system 100 by the controller 160 can be based adjusting operation of one or more of the components thereof using one or more control signals.

Control Strategies for Thermal Conditioning Systems

The control algorithms shown in FIGS. 2-4 and described below for use with the system 100 can be generally applied to any convective thermal heating and cooling device including for use in vehicle seat cushions, seat backs, overhead or surrounding outlets, in-dash outlets, underseat outlets, armrests, headrests, neck warmers, or other contexts. Moreover, the control algorithms can be used with Peltier or other convective thermal engine systems.

Figure 2:
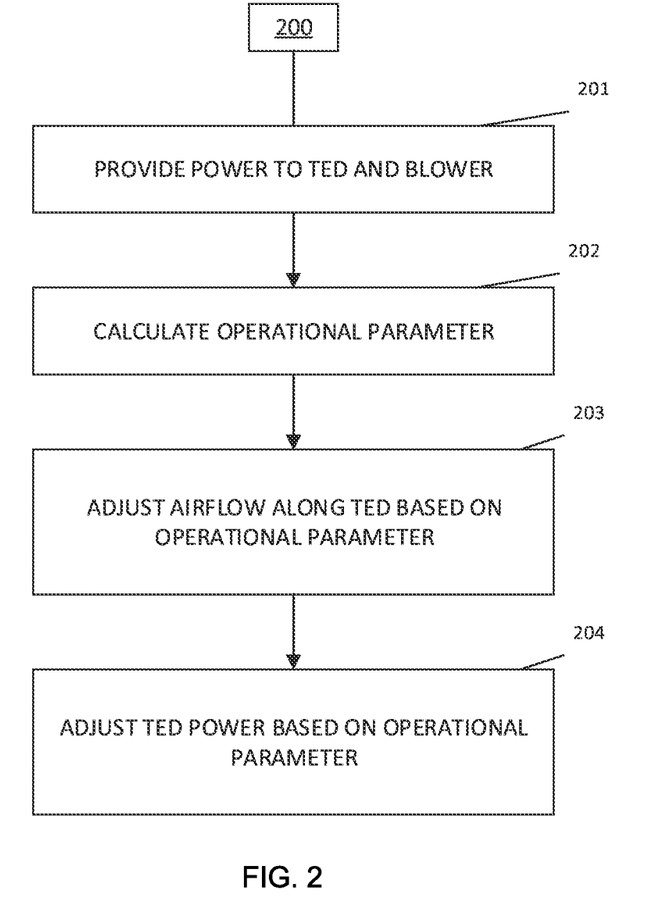
FIG. 2 is an algorithm for operating the thermal conditioning system based on an operational parameter.

FIG. 2 illustrates a control algorithm 200 for the system 100 based on an operational parameter. Operational parameters can include: providing the conditioned air at a desired temperatures, mass flow rates, or energy consumption rates; optimizing thermal efficiency of the TED 120 and/or blower 150; operating the TED 120 within an acceptable temperature range; controlling humidity within the system 100; limiting temperatures of the end effector within an acceptable temperature range; compensating for temperature losses in the airflow; whether the system 100 is in a startup, steady-state, operating the TED 120 based on an efficiency of heat transfer to the airflow; heat transfer coefficient of a heat exchanger; specific heat of the airflow or other operating mode, etc.

At Step 201, power can be provided to the TED 120 and to the blower 150. The amount of power provided can be based on a default setting. The speed of the blower 150 can be set based on reducing noise. The TED 120 power can be set based on reaching an initial heating or cooling temperature, which may be above or below a set temperature.

At Step 202, an operational parameter of the system 100 can be calculated, such as the operational parameters listed above.

At Steps 203 and 204, the control algorithm 200 can vary one or more parameters of the system 100 to achieve the operational goals. A primary control mechanism of the system 100 can be to adjust the power supplied to the TED 120 (e.g. by controlling the duty cycle that regulates the electrical power supplied to the TED). The power provided to the TED 120 may have the largest impact on total electrical power consumption of the system 100. A secondary control mechanism of the system 100 is adjusting the position of the flow control valve 140. The position of the flow control valve 140 controls the portion of the total air flow that passes the main side of the TED 120 and can adjust the temperature and amount of the airflow passing to the outlet 112 and/or outlet 114. A tertiary control mechanism of the system 100 is to regulate the speed of the blower 150. The blower 150 can control the total air flow rate through the system 100 and accordingly the temperature and amount of the airflow passing therethrough to the outlet 112.

Figure 3:
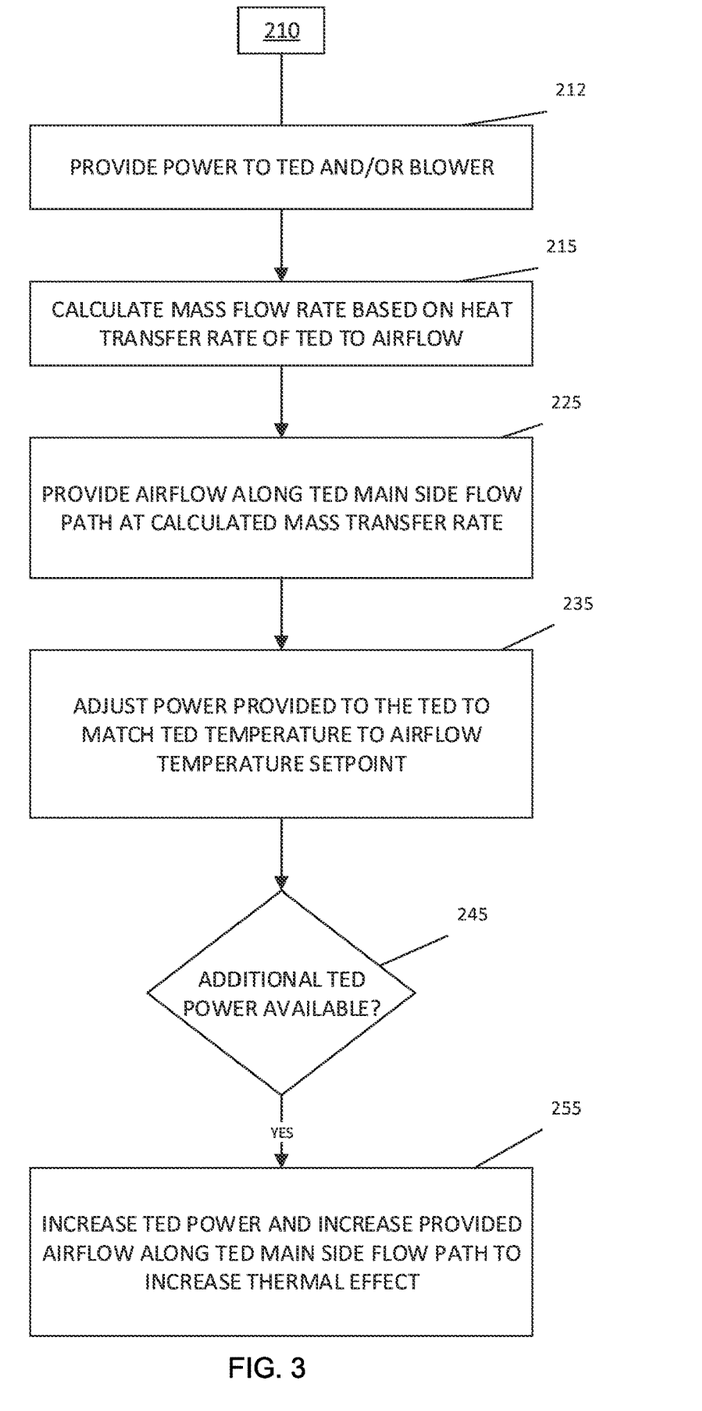
FIG. 3 is an algorithm for operating the thermal conditioning system based on optimizing a heat transfer rate from the TED to the airflow.

FIG. 3 shows a control algorithm 210 for the system 100 that achieves a desired outlet temperature for the airflow and increases or optimizes a thermal efficiency between the TED 120 and the airflow. In certain implementations, the control algorithm 210 regulates the airflow rate the system 100 to maximize the thermal power output when provide heating or cooling. The control algorithm 210 can maintain the highest effectual delta temperature ($\Delta T$) across the TED 120 whether the system 100 is heating or cooling.

At Step 212, the system 100 can provide power to the TED 120 and/or the blower 150. The controller 160 can send a signal to provide power to the blower 150 and/or the TED 120. The initial blower 150 speed be selected based on reducing noise. The initial TED 120 setting can be 100% power or a lesser, average power consumption setting to warm or cool the initial airflow.

At Step 215, the system 100 can calculate a mass flow rate for airflow on the main side flow path 132 along the TED 120. The calculated mass flow rate ($\dot{m}_{main}$) can be configured to optimize heat transfer between the TED 120 and the airflow on the main side flow path 132 based on the properties of the system 100 according to the relationship in Equation 1:

$$\dot{m}_{main} = \frac{h_x A_{duct}}{2 C_P} \quad \quad 1.$$

where:
$\dot{m}_{main}$=mass flow rate on main side flow path 132
$C_P$=specific heat of fluid in airflow
$h_x$=heat transfer coefficient of TED 120
$A_{duct}$=cross sectional area of main side flow path 132
Equation 1 is derived based on substituting Equations 3 and 4 into Equation 2.

$$\dot{m}_{main} C_P (T_{ntc,fb} - T_{cabin}) = h_x A_{duct} (T_{ntc,fb} - T_{film}) \quad \quad 2.$$

$$T_{film} = (T_{ntc,fb} - T_{cabin})/2 \quad \quad 3.$$

$$T_{exit\ air} = T_{ntc,fb} \quad \quad 4.$$

where:
$T_{ntc,fb}$=measured temperature of TED at sensor 171
$T_{cabin}$=vehicle cabin temperature
$T_{film}$=film temperature of airflow within main side flow path 132

Equation 2 describes the relationship between heat capacity, flow rate, and temperature and heat transfer rate for the airflow. The left side of the Equation 2 is the power carried in the airflow and the right side of Equation 2 is the power transferred from the TED 120 to the airflow. Equation 3 describes the temperature gradient in the airflow flowing through the heat exchanger of the TED 120 on the main side flow path 132. Equation 4 defines the conditions when the heat transfer rate is maximized between the airflow and the TED 120. Substituting Equations 3 and 4 into Equation 2 produces Equation 1.

The heat transfer coefficient of TED 120 ($h_x$) can vary based on the temperatures or speeds of the airflow and the temperature and design of the TED 120 (e.g., heat exchangers). Accordingly, the heat transfer coefficient may be estimated based on calculations or retrieved from a reference library corresponding to the physical conditions of the system 100.

At Step 225 the system 100 can adjust the airflow over the main side flow path 132 to match the calculated mass flow rate. The airflow provided by the blower 150 can be split by the flow control valve 140 between the main side path 132 and the waste side paths 134. The desired mass flow rate can be achieved based on the position of the flow control valve 140 and the speed of the blower 150. Generally, the speed of the blower 150 can be maintained and the position of the flow control valve 140 adjusted. However, the speed of the blower 150 can be adjusted and the position of the flow control valve 140 maintained, or both can be adjusted.

The system 100 can further adjusting the airflow across the waste side 124 (e.g., on the waste side flow path 134) of the TED 120. The airflow on the waste side flow path 134 can be controlled using the flow control valve 140 and/or the blower 150. The airflow on the waste side 124 can be controlled to increases or limit a delta temperature between the main and waste sides 122, 124 of the TED 120. The delta temperature can be limited by limited airflow on the waste side 124 to prevent damage to the TED 120. The delta temperature can be increased by increased airflow on the waste side 124 to enhance the effect of the TED 120 on the airflow of the main side flow path 132.

At Step 235, the system 100 can adjust the power provided the TED 120. The power to the TED 120 can be adjusted until $T_{ntc}$ equals the set temperature for the airflow at the outlet ($T_{exit}$). By equating $T_{NTC}$ with $T_{exit}$, the heat transfer from the TED 120 to the airflow is maximized without requiring excess energy. The temperature setpoint is an input to this system 100.

This adjustment can be based on feedback from the sensor 171. The adjustment could also use the explicit relationship shown in Equation 5 in a feedforward based control. The adjustment could also be based on a combination of feedback and feedforward controls for an improved response. Equation 5 represents the relationship between the TED power (electrical power supplied by circuit to TED 120) to the heat transfer rate to the airstream passing the main side flow path 132.

$$q_{TED} = K_{calibration} \dot{m}_{main} C_P (T_{ntc,fb} - T_{cabin}) \quad \quad 5.$$

where:
$K_{calibration}$=represents heat transfer mechanism efficiency

At Step 245, the system 100 determines the amount of power delivered by the TED 120 to the airflow (e.g., using Equation 2) and compares it with the available power (i.e., electrical power capacity) for the TED 120. The availability of excess power to the TED 120 when operating at the optimal heat transfer rate means that the system 100 may be operated for greater thermal effect by increasing power to the TED 120 and increasing the speed of the blower 150. This mode allows the device to provide maximum effect, but is not necessarily utilizing optimal heat transfer rate if the mass transfer rate calculated above in Equation 1 is exceeded.

At Step 255, the power to the TED 120 is increased and the speed of the blower 150 is increased to provide an increased thermal effect for the system 100. In certain implementations, the increased thermal effect for the system 100 can be maximized based on using 100% of the available TED power. The increased thermal effect mode may be used for various situations other than optimizing the heat transfer rate. Certain examples include preconditioning a touch surface for increased occupant comfort, drying within the system 100 or the end effector, or providing comfort otherwise unrelated to thermal effect, etc.

In certain implementations, the airflow can be increased incrementally and the TED power can be maintained as in Step 235. The airflow can be increased until the TED power saturates (e.g., main side airflow temperature drops below setpoint temperature). However, this approach may be slow and/or unstable. Alternatively, a feedforward algorithm can be used to predict the airflow level. The feedforward term can be formed in different ways. One method would be to extrapolate the current states of the system 100 to the desired state by measuring the gradients and applying a linear relationship. In one example, mass flow rate is x, going to y and power is a going to b (max power). Assuming temperature is constant, you can do a straight line interpolation and solve for the unknown mass flow rate y. A more complex solution would be to use the Equations 2 or 5 listed above as a dynamic transfer function. In this case the transfer function can solve for mass flow rate based on the known variables in the system 100. In another alternative, the incremental approach and the feedforward approach can be used together. Using either the interpolation or dynamic transfer functions feedforward approach, a mass flow rate can be calculated and the mass flow rate of the system 100 can be incrementally increased towards that calculated mass flow rate. Iterating the feedforward calculation can improve the calculated mass flow rate.

Figure 4:
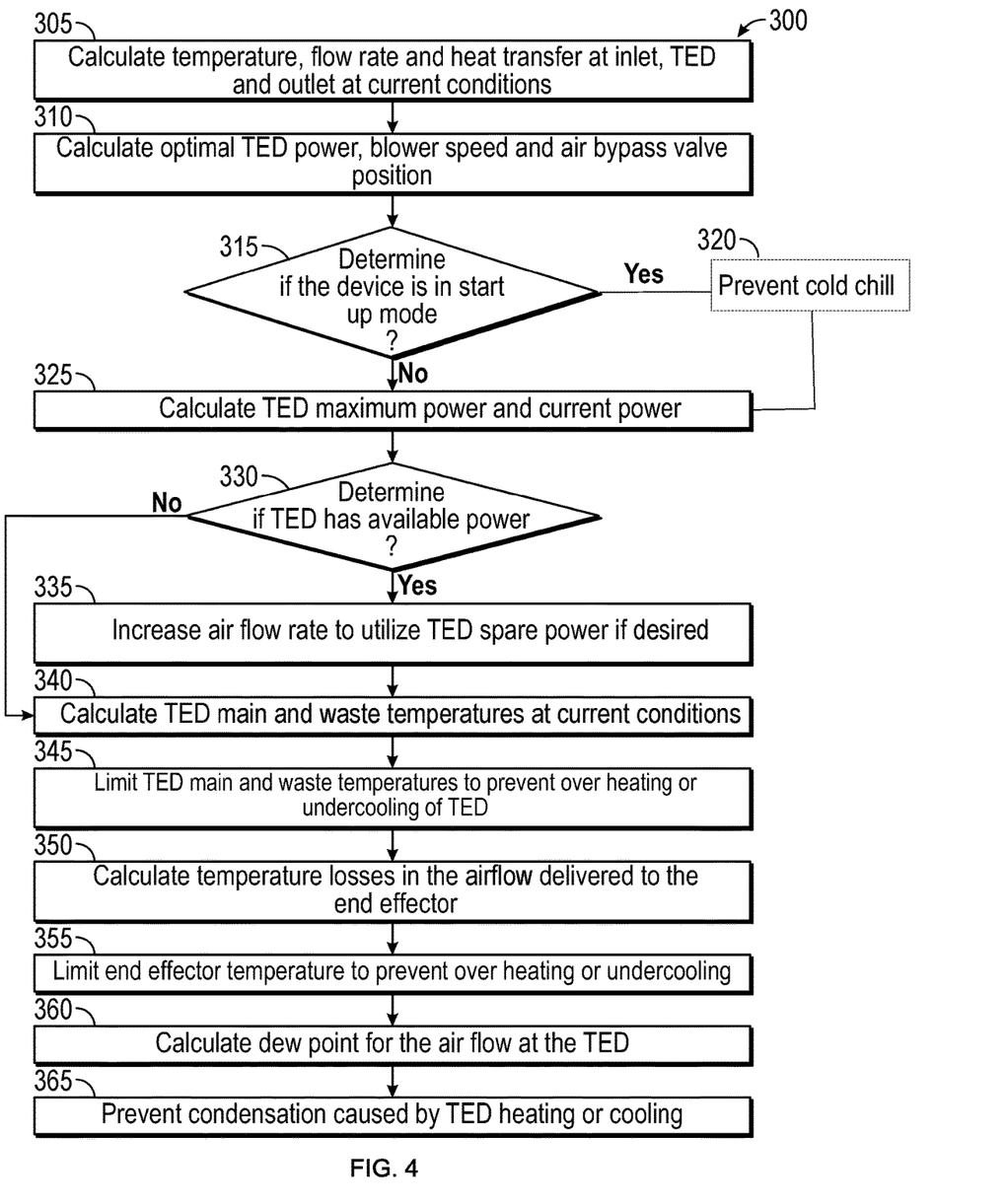
FIG. 4 is an algorithm for operating the thermal conditioning system based on multiple operational parameters.

Another control algorithm 300 for operating the system 100 based on one or more operation parameters is shown in greater detail in FIG. 4. At Step 305, the system 100 can calculate, receive, and/or measure current operating conditions. These may include the temperature of the TED 120 (e.g., sensor 171), the speed of the blower 150, the position of the flow control valve 140, and/or the temperature of the airflow at the inlet (intake temperature) 110, outlet 112 and/or outlet 114.

At Step 310, the system 100 can calculate the optimal mass flow rate on the main side flow path 132, adjust the speed of the blower 150 and/or the flow control valve 140, and optimize the power to the TED 120 to achieve the thermal transfer rate as described above in algorithm 210.

At Step 315, the system 100 can detect whether it is in an initialization or startup mode. Under startup conditions, the TED 120 may not be fully up to temperature to provide sufficient heating or cooling. Providing excess airflow across an under-warmed TED may result in blowing colder air through outlet 112 than is desirable. This may result in chilling of the conditioned spaces when the system 100 is being used as a heater. Accordingly, at Step 320, the startup mode can limit blower speed or delay starting the blower 150 until the TED 120 has heated to a sufficient degree or for a specified waiting period. Whether the TED 120 has heated sufficiently may be based on timing and/or power consumption of the TED 120.

At Steps 325-335, the system 100 may calculate, and optionally utilize an increased thermal effect mode that includes power the TED 120 and/or blower speeds above the optimal mass transfer rate, as described above in algorithm 210.

At Step 340, the system 100 can estimate temperatures of the main and waste sides 122, 124 of the TED 120. This estimate may be based, at least in part, on the power provided the TED 120, the position of the flow control valve 140, temperature sensor 171, and/or the speed of the blower 150. At Step 345, the system 100 can prevent the TED 120 from exceeding temperature limits (e.g., thresholds) on either of the main and waste sides 122, 124 that could damage the device over time. If a temperature outside an allowable range is detected, one or more of the power provided the TED 120, the position of the flow control valve 140, and/or the speed of the blower 150 can be adjusted to bring the TED 120 back into the desired temperature range.

At Step 350, the system 100 estimates the temperature losses in the airflow delivered to the end effector (e.g., a seat surface) connected with the outlet 112. This calculation can be based on the airflow temperature, the ambient temperature of the cabin, the temperature sensor 171, the length of the passageway leading to the seat surface, the power to the TED 120, the position of the flow control valve 140, and/or the speed of the blower 150. At Step 355, the system 100 can prevent overheated or undercooled-air being delivered to the end effector. If a temperature outside an allowable range is detected, one or more of the power provided the TED 120, the position of the flow control valve 140, and/or the speed of the blower 150 can be adjusted to bring the airflow to the end effector back into the desired temperature range. The end effector can optionally be a vehicle seat, an occupant's skin, a device outlet, a footwell, a seatback, or other surface.

At Step 360, the system 100 calculates a dew point on a cooled side of the TED 120 (e.g., the main side flow path 132 or the waste side flow path 134, depending on heater or cooler usage). Excess cooling of humid air can result in undesirable condensation within the system 100 and/or at the end effector. The humidity of the air entering the system 100 can be known based on a signal from an outside system (e.g., vehicle). The system 100 then calculates the corresponding dew point temperature. At Step 365, if temperatures within the system 100 are calculated to cause condensation, one or more of the power provided the TED 120, the position of the flow control valve 140, and/or the speed of the blower 150 can be adjusted to prevent airflow and/or dry the flow path of the airflow. This mechanism can be applied in either heating or cooling modes of operation.

The software for the system 100 and the control algorithms above have been architected to support operation either as a standalone device that can receive temperature and flow intensity setpoints directly from the system user or as part of an integrated vehicle comfort solution where it provides information about the thermal effect of the device that can be used by the vehicle comfort control system to optimize comfort, time to comfort, and energy used to achieve both. The software and architecture have been designed to include models of the local thermal conditions in the vehicle. These calculated thermal states allow the system 100 to be used intelligently and efficiently as part of a vehicle thermal climate pre-conditioning system. Specifically the system 100 will control local temperatures according to cabin conditions and so does not need any special programming to be used in pre-conditioning mode of operation, because it will maintain the correct outlet air flow and temperature regardless of vehicle occupancy or operation. The benefit is the reduction in energy used compared with empirical control methods where the operation and setpoints must be uniquely defined in each mode of operation of the system.

Certain Terminology

Terms of orientation used herein, such as "top," "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" can refer to something that departs from exactly parallel by less than or equal to 20 degrees. All ranges are inclusive of endpoints.

Summary

Several illustrative examples of thermal systems and controls have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one example in this disclosure can be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various examples can be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules can be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification can be included in any example.

In summary, various examples of thermal systems and related methods have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples can be combined with, or substituted for, one another. Accordingly, the scope of this disclosure should not be limited by the particular disclosed examples described above, but should be determined only by a fair reading of the claims.

What is claimed is:

1. A control method for a thermal conditioning system including a thermoelectric device (TED), comprising:
   providing power to the TED;
   providing an airflow across a main side of the TED with a blower at a first blower speed;
   calculating an operational parameter based at least on the power provided to the TED, wherein the operational parameter is based on a heat transfer coefficient for a heat exchanger on the main side of the TED and a specific heat of the airflow; and
   adjusting the airflow across the main side of the TED based on the operational parameter.

2. The control method of claim 1, wherein the operational parameter is proportional to a cross-sectional area of a main side flow path of the TED.

3. The control method of claim 2, wherein the operational parameter is a mass flow rate of the airflow across the main side of the TED.

4. The control method of claim 3, wherein the mass flow rate is based on a heat transfer coefficient between the TED and the airflow.

5. The control method of claim 3, wherein the mass flow rate is based on optimizing a heat transfer rate between the TED and the airflow.

6. The control method of claim 5, wherein the heat transfer rate between the TED and the airflow is calculated based on, at least, an intake temperature of the airflow and a heat transfer coefficient of the TED.

7. The control method of claim 5, wherein the heat transfer rate between the TED and the airflow is calculated based on, at least, the power provided to the TED.

8. The control method of claim 1, wherein adjusting the airflow based on the operational parameter includes adjusting a position of a flow control valve based on the operational parameter, the flow control valve configured to divide the airflow between the main side and a waste side of the TED.

9. The control method of claim 1, wherein adjusting the airflow based on the operational parameter includes adjusting the first blower speed to a second blower speed.

10. The control method of claim 1, further comprising: adjusting the power provided to the TED based on the operational parameter.

11. The control method of claim 10, wherein the power provided to the TED is adjusted such that a temperature of the TED matches a temperature of the airflow at an outlet of the thermal conditioning system.

12. The control method of claim 1, further comprising:
    comparing the power provided to the TED with an available power to the TED;
    increasing the power provided the TED to use the available power; and
    increasing the first blower speed to a second blower speed to increase a thermal effect of the airflow.

13. The control method of claim 1, further comprising:
    adjusting at least one of: the airflow, a position of a flow control valve, or the power provided to the TED to avoid temperatures above a damaging threshold.

14. The control method of claim 1, further comprising:
    estimating a temperature loss in the airflow between the main side of the TED and an end effector; and
    adjusting at least one of: the airflow, a position of a flow control valve, or the power provided to the TED to avoid delivering overheated or undercooled air to the end effector.

15. The control method of claim 14, wherein the end effector is a surface of a vehicle seat, an occupant's skin, a device outlet, a footwell, or seatback.

16. The control method of claim 14, wherein the blower is not activated until the TED is capable of heating the airflow on the main side to above an acceptable temperature.

17. The control method of claim 1, further comprising:
    measuring a humidity of the airflow;
    calculating a dew point of the airflow based on the measured humidity; and
    adjusting at least one of: the airflow, a flow control valve position, or the power provided to the TED to avoid cooling the airflow below the dew point to avoid condensation within the thermal conditioning system.

18. The control method of claim 17, wherein the TED is in a heating mode and the airflow on a waste side is cooled.

19. The control method of claim 17, wherein the TED is in a cooling mode and the airflow on the main side is cooled.

20. The control method of claim 1, wherein the thermal conditioning system is disposed within a vehicle seat.

21. The control method of claim 1, further comprising adjusting the airflow across a waste side of the TED to control a delta temperature of the TED.

* * * * *